(12) United States Patent
Dille et al.

(10) Patent No.: US 11,343,338 B2
(45) Date of Patent: May 24, 2022

(54) ANALYZING WEBSITE PERFORMANCE

(71) Applicant: Quantum Metric, Inc., Colorado Springs, CO (US)

(72) Inventors: Adam Dille, Monument, CO (US); Mario Luciano Ciabarra, Jr., Colorado Springs, CO (US); Hunter Pickett, Colorado Springs, CO (US)

(73) Assignee: Quantum Metric, Inc., Colorado Spring, CO (US)

( * ) Notice: Subject to any disclaimer, the term of this patent is extended or adjusted under 35 U.S.C. 154(b) by 0 days.

(21) Appl. No.: 17/079,311

(22) Filed: Oct. 23, 2020

(65) Prior Publication Data
US 2022/0131769 A1    Apr. 28, 2022

(51) Int. Cl.
| | | |
|---|---|---|
| *H04L 29/08* | (2006.01) | |
| *H04L 67/50* | (2022.01) | |
| *H04L 41/5067* | (2022.01) | |
| *H04L 43/04* | (2022.01) | |
| *G06F 11/34* | (2006.01) | |

(Continued)

(52) U.S. Cl.
CPC .......... *H04L 67/22* (2013.01); *G06F 11/3476* (2013.01); *H04L 41/5067* (2013.01); *H04L 43/04* (2013.01); *H04L 43/045* (2013.01); *H04L 67/36* (2013.01)

(58) Field of Classification Search
CPC .. G06F 11/34; G06F 11/3409; G06F 11/3419; G06F 11/3438; G06F 11/3452; G06F 11/3466; G06F 11/3476; H04L 43/04; H04L 43/045; H04L 43/06; H04L 43/067; H04L 67/02; H04L 67/22; H04L 67/36
See application file for complete search history.

(56) References Cited

U.S. PATENT DOCUMENTS 8,543,900 B1 *  9/2013  Kent ...................... H04L 67/22
                                                            715/205
9,250,759 B1 *  2/2016  Commons ........... G06F 16/9535
(Continued)

OTHER PUBLICATIONS

Semerádová, Tereza, and Petr Weinlich. "Using Google Analytics to Examine the Website Traffic." Website Quality and Shopping Behavior. Springer, Cham, 2020. 91-112. (Year: 2020).*

*Primary Examiner* — Atta Khan
*Assistant Examiner* — William C McBeth
(74) *Attorney, Agent, or Firm* — Kilpatrick Townsend Stockton LLP

(57) ABSTRACT

Techniques are described herein for determining an impact of slow performing webpages on a website. For example, a detection system may be provided to determine timing distributions for webpages by analyzing timing measurements for different timing metrics. The detection system may determine ranges of the timing distributions for slow and fast group of users of the website. The detection system may analyze user interactions of slow and fast group of users on the website. The detection system may further determine impacts of poor performing webpages on the website's performance based on the analysis of the user interactions on the webpages. The detection system may classify the impacts the webpages of the website and display the classifications to a website provider for identifying network operation(s) contributing to poor performance of the webpages.

20 Claims, 12 Drawing Sheets

(51) Int. Cl.
*H04L 67/75* (2022.01)
*H04L 43/045* (2022.01)

(56) References Cited

U.S. PATENT DOCUMENTS

| | | | |
|---|---|---|---|
| 2003/0130982 A1* | 7/2003 | Kasriel | G06F 16/958 |
| 2003/0221000 A1* | 11/2003 | Cherkasova | H04L 67/02 |
| | | | 709/224 |
| 2005/0114510 A1* | 5/2005 | Error | G06Q 30/02 |
| | | | 709/225 |
| 2008/0104224 A1* | 5/2008 | Litofsky | H04L 67/22 |
| | | | 709/224 |
| 2013/0091118 A1* | 4/2013 | Ajoku | G06F 16/9566 |
| | | | 707/709 |
| 2013/0205020 A1* | 8/2013 | Broda | G06F 11/3419 |
| | | | 709/224 |
| 2015/0149621 A1* | 5/2015 | Butler | H04L 67/22 |
| | | | 709/224 |
| 2018/0123922 A1* | 5/2018 | Nataraj | H04L 43/08 |
| 2020/0328952 A1* | 10/2020 | Makwarth | H04L 41/5009 |
| 2021/0158187 A1* | 5/2021 | Chavan | G06F 16/958 |

* cited by examiner

Which pages are costing you the most? (10)

| Page | Type | Conversion impact ▾ | Page Load 610  620 |
|---|---|---|---|
| ● All Pages ←410 | All | - | |
| ○ shop.xyz.com/ ←420 | Page | High | *Conversion Impact* — Conversion rate drop when this page is slower 11.4% / Visitors with a slow experience on this page 7.0% |
| ○ shop.xyz.com/shop/mybag | Page | High | 3.87s |
| ○ shop.xyz.com/checkout/spk/index.jsp | Page | High | 3.87s |
| ○ shop.xyz.com/c/women/_/N-1z13zi2Z7vl | Page | Medium | 4.37s |
| ○ info.xyz.com/help/size-chart | Page | Low | 2.50s |

FIG. 6

Which pages are costing you the most? (10)

| Page | Type | Conversion Impact ▼ | Page Load |
|---|---|---|---|
| ● All Pages ← 410 | | ↑ OUT OF RANGE | OUT OF RANGE ▲ |
| ○ shop.xyz.com/ ← 420 | Page Load | | 3.81s OUT OF RANGE ▲ |
| ○ shop.xyz.com/shop/mybag | Historical Range | 2.55s-3.27s ← 720 | ← 730 |
| ○ shop.xyz.com/checkout/spk/index.jsp | Page | High | |
| ○ shop.xyz.com/women/_AN-1z13ziz27vf | Page | Medium | 4.37s |
| ○ info.xyz.com/help/size-chart | Page | Low | 2.59s |
| ○ shop.xyz.com/secure/account/login.jsp | Page | Low | 2.64s |
| ○ shop.xyz.com/checkout/spk/confirmation.jsp | Page | Low | 3.08s |
| ○ api.scraperapi.com/ | Page | - | 16.2s |
| ○ shop.xyz.com/secure/account/index.jsp | Page | - | 2.48s OUT OF RANGE ▲ |

| Metric Breakdown (8) 900 | | | | |
|---|---|---|---|---|
| Name | Average 910 | Median 920 | 90% 930 | 95% 940 |
| ○ Page Load 510 | 5.75s | 3.85s | 9.03s | 12.37s |
| ○ DOM Complete 520 | 5.72s | 3.83s | 9s | 12.36s |
| ● DOM Interactive 530 | 2.35s | 1.47s | 3.81s | 5.38s |
| ○ First Paint 540 | 38.8s | 1.38s | 4.41s | 10.49s |
| ○ First Contentful Paint 550 | 38.8s | 1.38s | 4.42s | 10.5s |
| ○ SPA Transition Duration 560 | - | - | - | - |
| ○ Client Time 570 | 4.7s | 3.04s | 7.75s | 10.68s |
| ○ Server Time 580 | 656ms | 217ms | 1.2s | 1.67s |

FIG. 9

ANALYZING WEBSITE PERFORMANCE

BACKGROUND

The present disclosure relates generally to analyzing user interactions on a website and the website's performance. Typically, when a user (e.g., a website visitor) is browsing a website, certain issues such as a delay in loading a webpage of the website may frustrate the user and cause the user to abandon the website or stop performing specific actions on the website. The longer it takes for a webpage to download and become interactive for the user, the less likely the user is going to stay on the website and perform specific actions on the website.

As digital monitoring of user interactions on websites becomes more common, digital administrators desire tools to identify issues with websites and impacts of the issues on a website's performance more accurately and efficiently. Therefore, there is a need for improved systems and methods to detect problems in overall website performance.

SUMMARY

Techniques are described herein for analyzing differences in user interactions and impacts on overall website performance. For example, a detection system may analyze deviations among user interactions of different users on a website, impacts of the deviations on overall website performance, and identify network operations responsible for causing the deviations in user interactions. For the sake of brevity, any mention of "page" later in this disclosure refers to a "webpage."

In an illustrative embodiment, the detection system may provide a user interface for a user to select a timing metric (e.g., a webpage load time) to analyze a set of webpages of a website. The detection system may access timing values (e.g., timing measurements) for the selected timing metric from capture agent(s). The timing values may be captured by the capture agent(s) by monitoring user interactions with the website in a plurality of previous web sessions.

The detection system may determine a timing distribution of the timing values for the selected timing metric for a set of webpages of the website. The detection system may further identify ranges of the timing distribution for users with slow and fast experiences on the set of webpages. The detection system may further analyze deviations in specific user interactions or actions involving the set of webpages for ranges of users with slow and fast experiences.

The detection system can determine a number of missed interactions for the set of webpages based on the deviations in the user interactions while users are experiencing slow or fast connections, and a number of users for the set of webpages. The set of webpages can then classified based on their impacts on overall website performance based users' fast or slow user experiences while surfing the set of webpages. The classifications of the set of webpages can then presented to a website to help the identification and resolving of issues involving the webpages on the website.

Other embodiments are directed to systems and computer readable media associated with methods described herein. A better understanding of the nature and advantages of embodiments of the present invention may be gained with reference to the following detailed description and the accompanying drawings.

BRIEF DESCRIPTION OF THE DRAWINGS

FIG. 6 illustrates an example of a user interface depicting detailed descriptions of impact classifications for a set of webpages according to certain embodiments described herein.

FIG. 7 illustrates an example of a user interface depicting a historical range of timing values for a timing metric for each of a set of webpages according to certain embodiments described herein.

FIG. 9 illustrates an example of a user interface depicting an individual webpage performance analysis for a timing metric according to certain embodiments described herein.

TERMS

Figure 1:
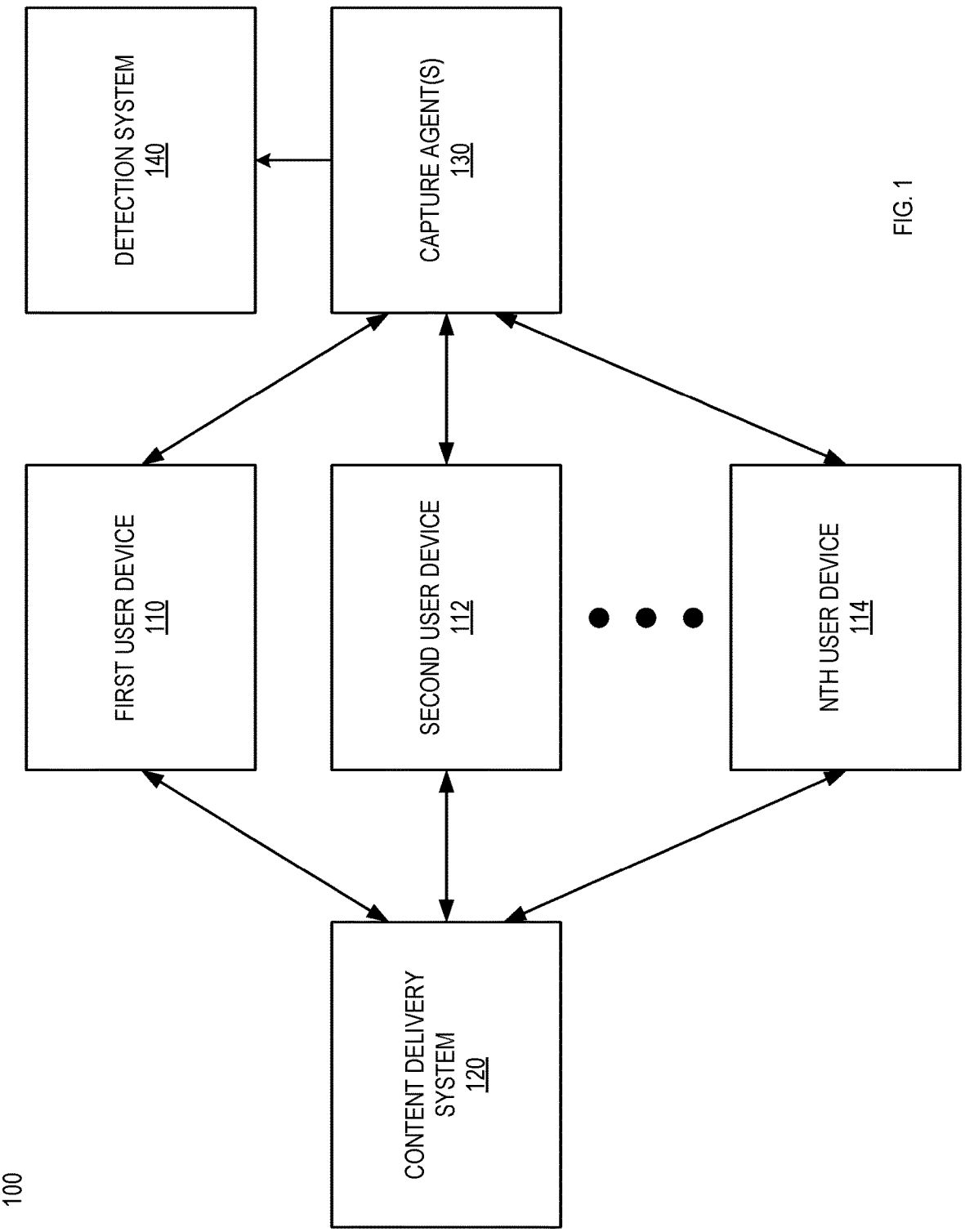
FIG. 1 illustrates an example of a distributed system for analyzing a website's performance according to certain embodiments described herein.

Prior to further describing embodiments of the disclosure, description of related terms is provided.

A "user" may include an individual that uses a website using a user device. The user may also be referred to as a "consumer" or "customer" depending on the type of the website.

A "client" may include an individual or entity that owns a website. The client may also be responsible for maintaining and presenting the website to a user. The client may employ some individuals (e.g., web developers) for the purpose of maintaining the website. The client may also be referred to as a "website owner" or "website provider."

A "user device" may comprise any suitable computing device that can be used for communication. A user device may also be referred to as a "communication device." A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of client devices include desktop computers, mobile phones (e.g., cellular phones), PDAs, tablet computers, net books, laptop computers, etc. Further examples of user devices include wearable devices, such as smart watches, fitness bands, ankle bracelets, etc., as well as automobiles with remote or direct communication capabilities. A user device may comprise any suitable hardware and software for performing such functions, and may also include multiple devices or components (e.g., when a device has remote access to a network by tethering to another device—i.e., using the other device as a modem—both devices taken together may be considered a single communication device).

A "client device" may comprise any suitable computing device that can be used for communication. The client device may be a computing device used by a client to host a website.

A "server computer" may include a powerful computer or cluster of computers. For example, the server computer can be a large mainframe, a minicomputer cluster, or a group of computers functioning as a unit. In some cases, the server computer may function as a web server or a database server. The server computer may include any hardware, software, other logic, or combination of the preceding for servicing the requests from one or more other computers. The term "computer system" may generally refer to a system including one or more server computers.

A "processor" or "processor circuit" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "session" or a "web session" general refers to a set of user interactions with a website. The session may include interactions starting with a user accessing a webpage of the website (e.g., using a web browser or other software application) and ending with the user ceasing interactions with the website (e.g., closing a webpage of the website within the web browser or software application). The time-length of the session in seconds, minutes, and/or hours can be determined based on a start time when the user first interacted with the website to an end time of the last interaction made by the user. The webserver hosting the website may store an identifier of the session and other information associated with the session (e.g., elements or items of the website selected by the user, or information input by the user).

A "timing metric" may be a type of timing measurement performed on webpages of a website to analyze the performance of the website. For example, a timing metric may include a page load time metric. The page load time metric may be an amount of time it takes for a webpage to be visible on a user's screen. The page load timing can be monitored by a monitoring mechanism such as a capture agent. A "capture agent" may be a Javascript embedded with a webpage that monitors the page load time for the webpage on a user device. Different types of timing metrics may include measuring timings at different stages of the page load process for a webpage. A timing metric may be customized to capture timing values associated with specific aspects of a webpage loading process. For example, a customized timing metric may be used to capture time taken for loading a specific image on the webpage.

A "timing value" may be a timing measurement for a timing metric. For example, a specific timing measurement (e.g., 0.4 milliseconds) may be a timing value for a page load time metric. Here, the timing value for a page load time metric may correspond to a time it took to load the page.

A "network operation" generally refers to an operation performed by a client device to load or display webpage on a user device. The network operation may be an event that occurred during a web session. In an example implementation, a timing metric may include timing values involving network operations occurred during a web session. For example, for a page load time metric, timing values involving certain network operations such as a requesting a webpage, processing of a webpage using a Transmission Control Protocol (TCP) protocol, and looking up a webpage on a Domain Name Server (DNS) may be combined. If looking up the webpage on the DNS takes too long then rest of the processes involving in loading the webpage may be delayed as well. Accordingly, a specific network operation may be responsible for a slow connection experience for a user which led the user to abandon a website or terminate a web session.

The term "providing" may include sending, transmitting, displaying or rendering, making available, or any other suitable method. While not necessarily described, messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

DETAILED DESCRIPTION

Users of websites and software applications can experience issues such as a delay in loading a webpage, software bugs, or interface design flaws that hinder them from taking certain actions (e.g., registering for a website or placing an order). In some cases, the issue may cause the user to abandon the website out of frustration. Such issues may not be identified by a web server hosting the website because the issues arise out of the generating and rendering of a webpage by the user's browser on a user device over Application Programming Interface (API) calls by the user's browser.

Techniques for identifying issues with websites may include monitoring user activities across the entire website. While activity monitoring can help identify whether users are abandoning the website or not performing certain actions, it does not help identify which elements of particular webpages are causing the user to abandon the website and user activities are impacting the website's performance.

Similarly, one could generally track a page load time for the website to identify network issues. However, simply monitoring a load time of a webpage is not helpful in identifying other issues relating to website architecture and the overall website performance. Accordingly, simply monitoring timing data or user actions for a website is not helpful in accurately recognizing and prioritizing problems with a website. For example, certain methods of monitoring user activities on a website may report an issue with the website even when no issue exists. For instance, user actions on a website are expected to be decreased late at night but these methods may still report an issue with the website due to a decrease in user actions at night. These methods are too sensitive in suspecting and reporting issues with the website.

In addition, a certain decrease in user actions on a popular website may not be a result of an issue whereas a similar amount of deviation in user actions on a less popular website may be due to an issue with a website. These systems do not differentiate between popular websites and less popular websites, and inaccurately report issues with websites using identical monitoring and analysis strategy for both types of websites.

Certain methods also do not provide impacts of certain user experiences on webpages of a website on overall website's performance. If an issue with a webpage (e.g., delay in loading the webpage) of a website has a huge impact on website's performance then the issue may require an immediate attention of a website provider. If the website provider is unaware of impacts of issues on the website's performance, issues requiring immediate attention may not be investigated with high priority.

In some scenarios, certain methods monitoring of user actions may not accurately identify any problem on a website when there is no change in overall rate of user actions. For example, when a certain software or a software update for a website is released and a loading issue exists while loading a website on a less popular browser, the website owner may not recognize the problem if an overall rate of user actions for the website is not much affected.

The embodiments disclosed herein provide improved systems and methods to analyze deviations in user interactions on webpages, determine impacts of the deviations on overall website performance, and identify network operations responsible for causing the deviation in user interactions. The improved systems and methods for analyzing deviations in user interactions on websites can be implemented by a detection system.

The detection system may retrieve one or more timing metrics from a client to perform analysis on multiple webpages of the website. The detection system may retrieve multiple timing values from previous and current web sessions for the timing metrics from a capture agent(s). The capture agent(s) may constantly monitor, capture, and store timing values for various timing metrics for multiple web sessions on multiple user devices.

Once the detection system retrieves timing values for the web sessions, the detection system then analyzes the timing values for a set of webpages accessed in the web sessions. For each webpage, the detection system determines a timing distribution (e.g., timescale) of the timing values. The detection system further identifies ranges of users that experienced slow or fast connections while visiting the set of webpages on the website. The detection system further analyzes changes in specific user interactions or actions involving the set of webpages while experiencing a slow or fast connection.

In an illustrative embodiment, the detection system also determines a number of missed interactions for the set of webpages based on the changes in specific user interactions while users are experiencing slow or fast connections and number of users browsing the set of webpages. The set of webpages are then classified based on their impacts on overall website performance.

The classifications of a set of webpages are presented to the web site owner for the owner to identify high impact webpages and focus on resolving issues involving the high impact webpages. The classification also helps web developers of the website to identify at least one network operation contributing to poor performance of the webpages.

Consequently, the web developers are able to efficiently pinpoint a code causing the poor performance, and perform debugging to improve the website design and operation. Further details of the detection system is described below with respect to the FIGS. 1 and 2.

I. High-Level Architecture for Detection System

FIG. 1 illustrates an example of a distributed system for analyzing a website's performance according to certain embodiments described herein. The distributed system is not intended to suggest any limitation as to scope of use or functionality of described embodiments.

The distributed system 100 may include one or more user devices, such as first user device 110, second user device 112, and nth user device 114. Each of the one or more user devices may be operated by a different user. For example, a user may be using an application for presenting content on a user device. The application may be a browser for presenting content from many different sources using uniform resource locators (URLs) to navigate to the different sources or an application associated with a defined number of one or more sources (e.g., an enterprise application for content associated with an enterprise).

The distributed system may further include content delivery system 120. Content delivery system 120 may be implemented to store content, such as electronic documents (e.g., a collection of webpages for a website). In one illustrative example, content delivery system 120 may be a web server that hosts a website by delivering the content.

The one or more user devices (e.g., first user device 110, second user device 112, and nth user device 114) may communicate with content delivery system 120 to exchange data via one or more communication networks. Examples of a communication network include, without restriction, the Internet, a wide area network (WAN), a local area network (LAN), an Ethernet network, a public or private network, a wired network, a wireless network, and the like, and combinations thereof.

In one illustrative example, first user device 110 may exchange data with content delivery system 120 to send instructions to and receive content from content delivery system 120. For example, a user device may send a request for a webpage to content delivery system 120. The request may be sent in response to a browser executing on the user device navigating to a uniform resource locator (URL) associated with content delivery system 120. In other examples, the request may be sent by an application executing on the user device.

In response to the request, content delivery system 120 may provide multiple webpages (or documents to implement the webpage, such as a Hypertext Markup Language (HTML) document) of the website to the user device. In some examples, the response may be transmitted to the user device via one or more data packets. The content delivery system 120 may deliver a web document or an original Document Object Model (DOM) associated with the webpage in response to the request. The content delivery system 120 may also capture and store certain timing information (e.g., time at receiving a request for a web document, an upload time for the requested web document, receiving acknowledgement after uploading the web document, etc.) for the requested webpage.

While the above description relates primarily to providing webpages, it should be recognized that communications between user devices and content delivery system 120 may include any type of content, including data processed, stored, used, or communicated by an application or a service. For example, content may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data"), system data, configuration data, synchronization data, or combinations thereof. A BLOB may include a collection of binary data stored as a single entity in a database management system, such as an image, multimedia object, or executable code, or as otherwise known in the art. For another example, content may include an extended markup language (XML) file, a JavaScript file, a configuration file, a visual asset, a media asset, a content item, etc., or a combination thereof.

The distributed system 100 may further include a capture agent(s) 130 that monitors, captures, and stores timing values and certain events that occur on user devices. For example, a user device may display a webpage. In such an example, capture agent(s) 130 may capture one or more interactions with the webpage that occur on the user device, such as movement of a mouse cursor, clicking on a certain button, or the like. The capture agent(s) 130 may also capture timing values for different timing metrics for webpages of a website. As illustrated in FIG. 1, the capture agent(s) 130 may be communicatively coupled (e.g., via one or more networks) to each of one or more user devices. For example, an instance of the capture agent(s) 130 may be communicatively coupled to first user device 110.

In some examples, instead of being separate from the user devices, an instance of capture agent(s) 130 may be executed on each of the user devices. In such examples, an additional portion of capture agent(s) 130 may be separate from each of the user devices, where the additional portion communicates with each instance. In some implementations, an instance of the capture agent(s) 130 may capture timing values for a specific timing metric for a different webpages, and transfer those values to the additional portion of capture agent(s) 130.

In addition or in the alternative, capture agent(s) 130 may be communicatively coupled to content delivery system 120 via a communication connection. In some scenarios, the capture agent(s) 130 may receive (e.g., via push or retrieval) certain timing data (g., as discussed herein) from the content delivery system 120, as well as content associated with the website (e.g., a DOM of a web page). In some implementations, a first instance of the capture agent(s) 130 may be loaded on a first web session on a first user device 110. Similarly, a second instance of the capture agent(s) 130 may be loaded on a second web session on a second user device 112. The first and second instances of capture agent(s) 130 monitors and captures timing values for timing metrics for the website on the first and second devices. The first and second instances then sends the timing values to the capture agent(s) 130 which further stores the timing values. Accordingly, the capture agent(s) 130 may store timing values for plurality of metrics on an individual page level of the website.

In an alternate embodiment, the capture agent(s) 130 may be an API plugged into a browser (e.g., Chrome, Firefox, etc.) to monitor timing values. The browser plugins may monitor these timings so it knows a user clicked a button asking of a new webpage and the browser is actually keeping track of each of these timing values as the new page loads.

As described above, capture agent(s) 130 may be implemented at least partially on a user device (e.g., client-side) where timing values and events are to be captured. In such embodiments, capture agent(s) 130 may be implemented in a variety of ways on the user device. For example, the capture agent(s) 130 may be implemented as instructions accessible in a library configured on the user device. The capture agent(s) 130 may be implemented in firmware, hardware, software, or a combination thereof. Capture agent 130 may provide a platform or an interface (e.g., an application programming interface) for an application to invoke the capture agent(s) 130 to monitor operations performed by a user device. In some embodiments, capture agent(s) 130 may be an application (e.g., an agent) residing on a user device. Capture agent 130 may be implemented using code or instructions (e.g., JavaScript) embedded in an application.

The distributed system 100 may further include a detection system 140. In some implementations, a client or a website owner may be provided with a user interface for the detection system, where the client may select one or more timing metrics to analyze a website's performance. In alternative implementation, the one or more timing metrics to analyze a specific website may be configured within the detection system 140. In an alternative embodiment, the detection system 140 may retrieve one or more timing metrics from a capture agent(s) 130 without requiring a user to select a timing metric.

The detection system 140 then retrieves timing values for the selected timing metrics from the capture agent(s) 130. The retrieved timing values may be timing values captured by the capture agent(s) 130 from multiple web sessions on multiple user devices for the set of webpages of the website. The detection system 140 may further perform a timing analysis on the set of webpages for the website.

In an illustrative embodiment, the detection system 140 may determine a timing distribution based on retrieved timing values for a selected timing metric. The detection system 140 may divide the timing distribution into multiple ranges. In certain implementations, the timing distribution may be divided into first and second range where the first range includes timing values lower than timing values that fall under the second range. The first range may correspond to a set of users with faster experience on the website while the second range may correspond to a set of users with slow experience on the website.

The detection system 140 further computes a rate of specific user actions for the set of users from the first range and the set of users from the second range. The detection system 140 then determines any difference between rates of specific user actions for the first and second ranges. The detection system 140 identifies whether the rate difference exceeds a certain threshold value.

The detection system 140 determines a number of missed user actions based on a number of users for the set of webpages and the rate difference for those webpages. The detection system 140 may further compute an impact of the missed user actions on the overall website's performance. The detection system 140 then displays the impact of the set of webpages to a website owner for the website owner to identify any network operations or components of the set of webpages contributing to the poor performance of the set of webpages. While detection system 140 is shown as a separate system, it should be recognized that detection system 140 may be included with capture agent(s) 130.

Each of first user device 110, second user device 112, nth user device 114, content delivery system 120, capture agent(s) 130, and/or detection system 140 may include one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Each of first user device 110, second user device 112, nth user device 114, content delivery system 120, capture agent(s) 130, and/or detection system 140 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like.

Each of first user device 110, second user device 112, nth user device 114, content delivery system 120, capture agent(s) 130, and/or detection system 140 may be implemented using hardware, firmware, software, or combinations thereof. In various embodiments, each of first user device 110, second user device 112, nth user device 114, content delivery system 120, capture agent(s) 130, and/or detection system 140 may be configured to run one or more services or software applications described herein. In some embodiments, content delivery system 120, capture agent(s) 130, and/or detection system 140 may be implemented as a cloud computing system.

Each of first user device 110, second user device 112, nth user device 114, content delivery system 120, capture agent(s) 130, and/or detection system 140 may include several subsystems and/or modules, including some, which may not be shown. Subsystems and/or modules of each of first user device 110, second user device 112, nth user device 114, content delivery system 120, capture agent(s) 130, and/or detection system 140 may be implemented in software (e.g., program code, instructions executable by a processor), in firmware, in hardware, or combinations thereof. The subsystems and/or modules of each of first user device 110, second user device 112, nth user device 114, content delivery system 120, capture agent(s) 130, and/or detection system 140 may be implemented to perform techniques disclosed herein.

In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein.

Each of first user device 110, second user device 112, nth user device 114, content delivery system 120, capture agent(s) 130, and/or detection system 140 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Each of first user device 110, second user device 112, nth user device 114, content delivery system 120, capture agent(s) 130, and/or detection system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof.

Each of first user device 110, second user device 112, nth user device 114, content delivery system 120, capture agent(s) 130, and/or detection system 140 may provide some services and/or applications that are in a virtual or non-virtual computing environment. Such services may be offered on-demand to client devices. In some embodiments, a specific instantiation of a service provided by detection system 140 may be referred to herein as a "service." Website owners may use one or more applications to interact and utilize the services or applications provided by content delivery system 120, capture agent(s) 130, and/or detection system 140. Services may be offered as a self-service or a subscription. Website owners or operators may acquire the application services without the need for users or visitors of websites to purchase separate licenses and support. Examples of services may include a service provided under a Software as a Service (SaaS) model, a web-based service, a cloud-based service, or some other service provided to a user device.

In some examples, a service may be an application service provided by content delivery system 120, capture agent(s) 130, and/or detection system 140 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications. The cloud computing system may be implemented as a cloud-based infrastructure that is accessible via one or more networks. Various different SaaS services may be provided.

A user device may include or be coupled to a display. A user device may provide access to one or more applications (also referred to herein as an "application program"). An application of the one or more applications may present content using the display. It should be recognized that an application may be executing on a user device, content delivery system 120, capture agent(s) 130, detection system 140, or a combination thereof. In some embodiments, an application may be accessed from one location and executed at a different location. For example, an application may be accessible at a client device as a service, but the application may be executing at detection system 140. An application may include information such as computer-executable or machine-executable instructions, code, or other computer-readable information. The information may be written in any suitable programming language to perform the various operations, functions, methods, and/or processes disclosed herein. The information may be configured for operation of the application as a program. Examples of applications may include, without restriction, a document browser, a web browser, a media application, or other types of applications.

In some embodiments, an application may be device specific. For example, the application may be developed as a native application for access on a particular device that has a configuration that supports the application. The application may be configured for a particular type of platform and/or particular type of device. As such, the application may be implemented for different types of devices. Devices may be different for a variety of factors, including manufacturer, hardware, supported operating system, or the like. The application may be written in different languages, each supported by a different type of device and/or a different type of platform for the device. For example, the application may be a mobile application or mobile native application that is configured for use on a particular mobile device.

In some embodiments, an application may generate a view of information, content, and/or resources, such as documents. For example, the application may display content to view on a user device. The view may be rendered based on one or more models. For example, a document may be rendered in the application, such as a web browser using a document object model (DOM). The view may be generated as an interface, e.g., a graphical user interface (GUI), based on a model. The document may be rendered in a view according to a format, e.g., a hypertext markup language (HTML) format. The interface for the view may be based on a structure or organization, such as a view hierarchy.

II. High Level Overview of Accessing Webpages and Determining Conversions

A web session associated with a website may include a set of user interactions with the website. The user interactions may include a user accessing a series of webpages of the website (e.g., using a web browser or a software application) and ceasing interactions with the website (e.g., closing a webpage of the website within the web browser or software application).

A session may include one or more "stages" that a user progresses through while accessing series of webpages until the user ends the session. The "stages" may be defined based on interactions made by the user (e.g., opening a webpage, selecting an element or item of the page, or inputting information in a particular location). For example, each stage may be associated with a particular interaction that brings the stage (e.g., opening a page, selecting an element, or submitting data) and a particular interaction that ends the stage (e.g., opening another page, selecting another element, or submitting other data). Each stage may be associated with one or more changes or updates to a webpage (e.g., a visual change or a change in the information obtained by the web server). For example, each webpage of the website presented to the user may correspond to a different stage. A specific interaction on a webpage may lead to a specific stage, where the specific stage is a different webpage.

An example of a set of stages during a session is provided below. In this example, a user opens a homepage of a website, which is associated with a first stage. During the first stage, the user browses the homepage and selects a link to open a second webpage on the website, thereby ending the first stage and beginning a second stage. The second stage can be associated with the second webpage. During the second stage, the user browses the second webpage and inputs information to the second webpage by selecting items or elements of the webpage or by inputting text into a field of the second webpage. This information is submitted to the website (which can be performed automatically by the website or performed manually by the user selecting a submit button).

The submission of such information can end the second stage and begin a third stage. The third stage can be associated with a third webpage. The third webpage may present confirmation of the information selected or input by the user. Not every session with a particular website will include the same stages nor will the stages always occur in the same order. Different sessions may include different stages and the stages may occur in different orders. In addition, while the stages are described as being associated with a particular webpage, the stages can be associated with particular in-line updates to blocks, fields, or elements of the same webpage (e.g., the same URL). In some scenarios, timing metrics for a webpage may be specific to timing values at different stages of loading a webpage. For example, a timing metric for loading a webpage may include a time required for loading a specific block or a field of the webpage.

A "target stage" may be associated with a specific event that is triggered as a result of user interactions on the website. In a list of stages, a target stage may be associated with a next stage or last stage reached by a user during a web session. In some scenario, a target stage may be a webpage accessed by a user when a user performs a specific website interactions such as a clicking on a button to place order, to register for a website, to sign up for a mailing list, to open link or other actions.

An event where a user reaches a target stage during a web session may be referred to as a "conversion" or "conversion event." A conversion generally refers to a digital action by a user that achieves a particular result or objective. For example, a "conversion" can include a user placing an order, registering for a website, signing up for a mailing list, opening a link, or performing any other action. As such, a mere "visitor" to a website has been converted into a "user" or "consumer" of the website. The conversion process may involve one or more intermediate actions taken by the user to achieve the result of objective. For example, a conversion process for placing an order can include the intermediate steps of visiting a website, selecting one or more items, adding one or more items to an order, selecting parameters for the order, inputting order information, and submitting the order. In another example, a conversion process for a user registering with a website can include the intermediate steps visiting the website, selecting a registration link, inputting an email address, and submitting the email address. The "performance" of a website or a particular webpage can be based on its "conversion rate." One method for determining a "conversion rate" (e.g., conversion percentage) is to compute the percentage of visitors to a website that perform a particular interaction or action on the website to reach a target stage.

III. Techniques for Detection System

Techniques are described herein for analyzing changes in user interactions on webpages, determining impact of the changes on overall website performance, and identifying network operations responsible for the changes in user interactions.

Figure 2:
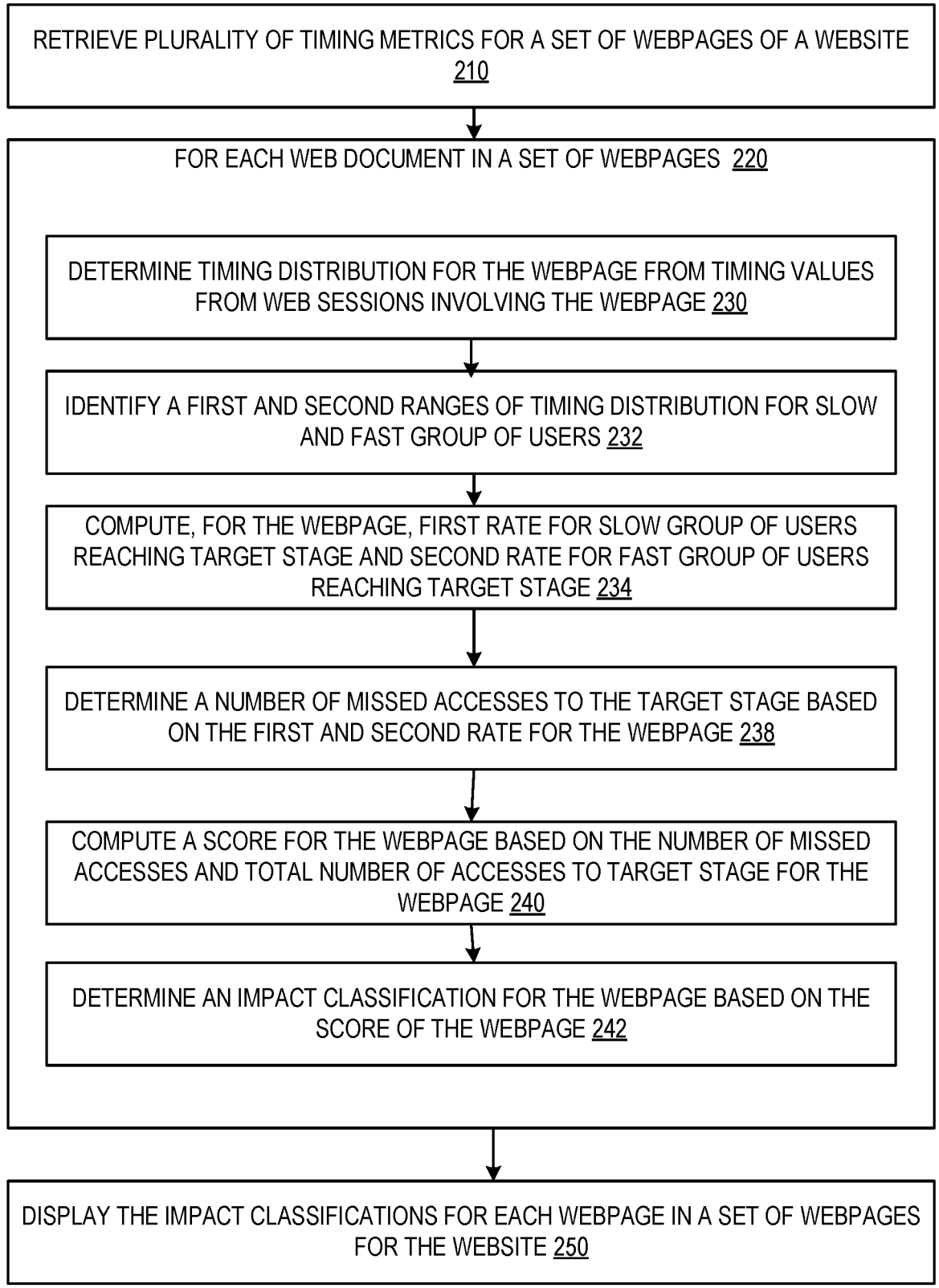
FIG. 2 is a flowchart depicting processing performed for analyzing webpages of a website according to certain embodiments described herein.

FIG. 2 is a flowchart depicting processing performed for analyzing a set of webpages of a website according to certain embodiments described herein. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG.

2 depicts the various processing steps occurring in a particular sequence or order, this is not intended to be limiting. In certain alternative embodiments, the steps may be performed in some different order or some steps may also be performed in parallel.

In the embodiment depicted in FIG. 2, the processing may be triggered at 210 when a detection system (e.g., detection system 140 in FIG. 1) retrieves plurality of timing metrics for webpages for a website. In an example embodiment, the plurality of timing metrics may be retrieved from a capture agent(s) 130. Each timing metric in the plurality of timing metrics may be associated with one or more network operations performed for loading and presenting webpages to users on their devices. In an example embodiment, a timing metric may be a combination of multiple timing metrics.

An example timing metric from the plurality of timing metrics may be a page load time metric. The page load time metric may be a combination of multiple timing metrics associated with one or more network operations involved in loading the webpage. For example, page load time metric may include a combination of a request time metric (e.g., time it took for a client device to request a webpage) and a server response time metric (e.g., time it took for a server to respond to the request). In some implementations, the page load time may be a combination of a client request time, a server response time, and time it took to load the webpage on a user's device after the browser receives a response from the server. Accordingly, a timing metric may be an aggregation of plurality of time points in time which can be measured. The client using the detection system 140 may select one or more metrics to be analyzed according to the steps disclosed herein.

In some scenarios, the page load time metric may include timing metrics associated with loading certain parts of the webpage on user devices. In the above embodiment, the network operations may be network operations such as requesting a webpage, processing of a webpage using a Transmission Control Protocol (TCP) protocol or looking up a webpage on a Domain Name Server (DNS), receiving a response from a server, and other operations. In some scenarios, the network operations may be associated with different phases of a page load life cycle. In an example implementation, different phases of page load life cycles may be phases of standard performance phases for a browser. The phases may include a redirect time, an application cache time, a Domain Name System (DNS) time, a request time, a response time, processing time, loading time, and TCP time.

Figure 5:
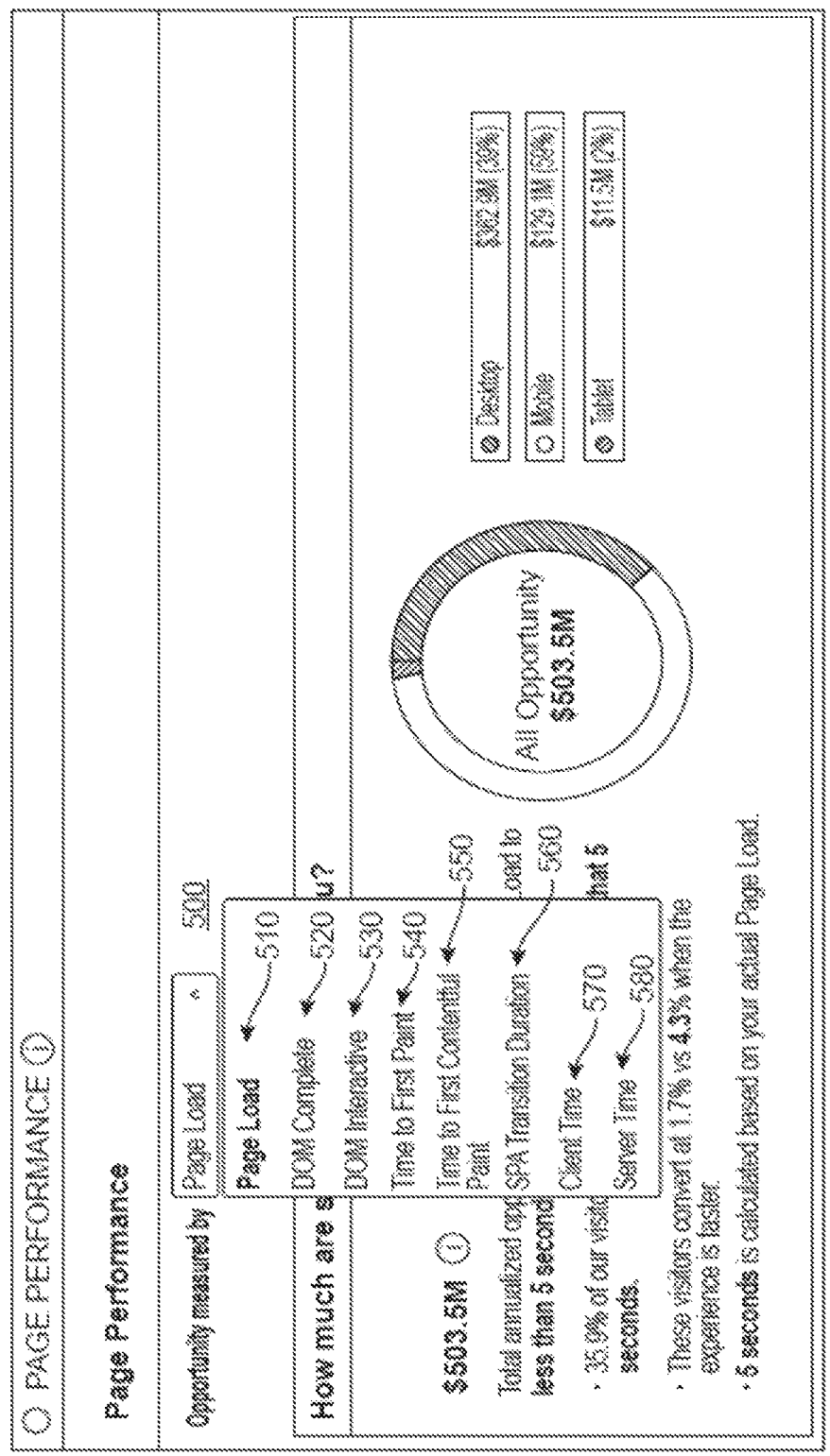
FIG. 5 illustrates an example of a user interface depicting types of timing metrics to be used for analyzing performance of a set of webpages according to certain embodiments described herein.

Once the detection system 140 has retrieved plurality of timing metrics, the system may present a set of timing metrics to a client or a website developer over a user interface (illustrated in FIG. 5). The user may select one or more metrics to perform timing analysis on webpages of the website. Alternatively, the detection system 140 may perform timing analysis for the plurality of timing metrics without requiring a user to select a specific timing metric.

In some implementations, timing metrics may be customized by a client (e.g., a website owner). The customized timing metrics may be defined within the capture agent(s) 130. Different type of timing metrics may be a page load time, a DOM completion time, a DOM interaction time, a first paint time, a first contentful paint time, a SPA transition time, a client time, and a server time. The DOM interaction time for a webpage may be a time taken for a web browser to finish parsing a web document (e.g., HTML document) and complete constructing DOM for the webpage. The DOM completion time may be a time taken to download all resources for the webpage. The DOM completion time may indicate that all of the processing for the webpage is complete and all of the resources on the webpage (e.g., images) have finished downloading. Upon DOM completion, the webpage browser's loading icon or spinner may stop spinning. The page load time may indicate the time taken to process any additional logic to load the webpage after DOM processing is complete.

The first paint time may indicate a time taken to display anything on the webpage. For example, the first paint time may be the time taken to paint a first pixel onto the screen. In another example, the first paint time may indicate a time taken to paint background color of the webpage on the screen. The first contentful paint time may indicate a time taken to paint content (e.g., images, text or canvas elements) of the webpage on the web browser screen.

Customized timing metrics may measure custom timings not directly provided by a standard performance API for web browsers. A website provider or client can define customized metrics such as a start and stop times for a specific event (e.g., loading an image on the webpage) and subsequently measure performance by aggregating these timing measurements for the customized metrics. The Single Page Application (SPA) transition time may a type of customized time metric to measure a webpage transition time (e.g., time taken to transition from one webpage to another).

The client time may include a time taken for requesting a web document to a server. Additionally, the client time may also include a time taken to load a webpage after receiving a web document from a server. In some scenarios, the client time may be aggregation of multiple timing measurements. The server time may include time take by a server to response to the client's request for a web document. Different website owners may be interested in tracking and analyzing different types of timing metrics to analyze their websites' performances. A client may combine one or more of the above timing metrics to create a custom timing metric or define a custom timing metric from scratch.

At 220, once the detection system 140 retrieves timing metrics to perform analysis on the website, the detection system 140 may perform analysis on a set of webpages for the website. Specifically, the detection system 140 may determine a set of webpages for the website and perform timing analysis for the selected timing metrics on each webpage for the website. For each webpage, the detection system 140 may retrieve timing values for the selected timing metrics from a capture agent(s) 130. The capture agent(s) 130 may monitor, capture, and store timing values or timing measurements for a plurality of timing metrics from plurality of web sessions (on plurality of user devices) involving each of webpages on a regular basis. (as discussed in FIG. 1 description).

At 230, for an individual webpage of a website, the detection system 140 may determine a timing distribution based on the timing values for the timing metric. The timing distribution is a distribution of timing values or measurements for a timing metric for the webpage. In an example implementation, a timing distribution for a page load time metric may include both a shortest time value recorded to load a webpage and longest time value recorded to load the same webpage.

At 232, the detection system 140 determines a multiple time ranges for the webpage based on the time distribution of the timing values for the webpage. In some implementations, the detection system may determine a first range and a second range based on the timing distribution, where the first range includes ranges of time values involving a certain group of users. Similarly, a second range may be determined which includes ranges of time values involving a different group of users. In an illustrative embodiment, the second range may be greater than the first range.

In the above embodiment, to determine multiple time ranges, the detection system 140 may determine a target value (e.g., a target load time) for the webpage. In some implementations, the target value may be calculated based on the timing values for a specific metric for the webpage. For example, the detection system 140 may assign weights to timing values and calculate a tri-mean of the weighted timing values, where the target value is the calculated tri-mean of the timing values. Timing values for certain webpages or websites may be given different weights depending on the number of visitors for those webpages or websites. The target value for a webpage may be a weighted average of the timing values.

In some implementations, a target value may be same for all of the webpages on the website. In alternative scenarios, a target value may be different for different webpages. In some scenarios, a target value may be a calculated tri-mean (a weighted average of a median of timing values and the median's two quartiles) of the timing values for one or more timing metric(s). The calculated target value may be padded by 25% (e.g., multiplying target value by 1.25) in order to generate an achievable target value. In some implementations, timing values that are close to a previously identified target value may be given lower weight than timing values that are much further representing very slow responses or connection to one or more users. Accordingly, timing values representing poor website performance may be given higher weight.

In the above embodiment, the first range may be timing values that exceed the target value and second range may be timing values below the target value. Accordingly, users with timing values that exceeds the target value may be classified as slow group of users and users with timing values below the target value may be classified as a fast group of users. The slow group of users are essentially users who visit the webpage and experience slow or no response while visiting the webpage or webpage.

In the above embodiment, the target value which is a tri-mean of weighted timing values may change as the website improves its performance. If performance of the webpage or the website is improved and load times for the webpage are lowered, then target value for the webpage may also drop based on new timing values (e.g., load values). Accordingly, the target value may be a dynamic tri-mean tailored for a specific webpage or a website.

In an alternative embodiment, the target value may be provided by the website owner or client via a user interface. For example, a client may identify a goal target value (e.g., 0.5 milliseconds) for a webpage or for a whole website. Specifically, the goal target value would be the value that client is trying to achieve on all of the webpages of the website. In certain scenarios, if a client of the detection system 140 believes the target value calculated by tri-mean for a webpage is not ambitious and believes that a better target value can be achieved, the client may set the goal target value that is different from the calculated tri-mean value. The detection system 140 may provide the client with a user interface (e.g., a slider bar) to adjust the target value.

As discussed, if timing values for a certain group of user is lower than the target value then the group of users will be identified as fast group of users and if timing values for a certain group of user is higher than the target value then the group of users will be identified as fast group of users. Two different groups of users may be on either side of the target goal on a given webpage based on their experience with that webpage. In an alternative embodiment, the detection system 140 may have a target value configured for one or more websites in accordance with industry standards. In another embodiment, the timing values for a webpage may be distributed between more than two ranges. In another embodiment, various different calculations may be performed to determine the ranges of timing values based on the target value.

At 234, the detection system 140 may compute conversion rate or a rate of specific user actions for groups of users with timing values in both first and second ranges. Specifically, the detection system 140 may determine a first rate of conversion for a slow group of users and a second rate of conversion for a fast group of users. For a webpage, the first rate of conversion may be a rate of slow users who successfully accessed a target stage from the webpage. Similarly, for the webpage, the second rate may be a rate of fast users who successfully accessed a target stage. The rates for slow and fast groups of users essentially provides information on how often a user performs specific interactions such as accessing a target stage when the user is experiencing slow versus fast connection. In the above embodiment, the target stage may correspond to a last stage within a set of stages associated with a web session on the website.

In some implementations, the detection system may determine the difference between the first rate of user interactions or conversions of a fast group of users and the second rate of conversions for a slow group of users. Specifically, the detection system may determine whether the rate difference exceeds a threshold value. In an example embodiment, if the rate difference exceeds the threshold value then further timing analysis (as shown in steps 238 to 250) is performed for the webpage. In an alternative embodiment, if the rate difference does not exceed a threshold then the detection system may interpret that the slow experience for the slow group of users didn't have significant impact on the users' likelihood to convert, and thus, does not perform any additional analysis. In some implementations, the timing analysis steps 238 to 250 are performed irrespective of the rate difference between fast group of users and slow group of users.

At step 238, the detection system determines a number of missed conversions (e.g., missed accesses to the target stage) for the webpage. The number of missed conversion may represent an estimated number of slow users from the slow group of users who should have converted to the target stage, but did not. To determine the number of missed conversions, the detection system multiplies number of users who experienced the webpage slow (number of users within the slow group of users) by the average conversion rate for users who had a fast experience (conversion rate for fast group of users). The detection system then subtracts the number of users from the slow group of users who actually converted to the target stage from the above multiplication.

Specifically, for each webpage, a number of missed conversions for users (e.g., slow group of users) whose timing values for timing metrics where higher than the target value may be determined based on the first rate (determined based on a slow sessions count (e.g., web sessions involving timing values higher than target value), total number of conversions for slow sessions) and the second rate (e.g., conversion rates for web sessions experiencing timing values for the webpage that are lower than target value), as described in step 234. Specifically, the missed number of conversions for the webpage may be calculated using the following formula: ((total slow sessions count*conversion rate of fast sessions)—total number of conversions for slow sessions). The resulting number of missed conversion is an estimated number of slow users who should have converted to the target stage, but did not due to slow experience.

At step 240, the detection system computes a normalized score for the webpage. To compute the score for the webpage, the detection system 140 identifies a total number of conversions or a specific user interaction for the website. Specifically, the total number of conversions are a total number of accesses to the target stage on the website. The detection system 140 computes score based on the total number of accesses to the target stage and the number of missed conversions (or missed accesses to the target stage) for the webpage. In an example embodiment, the detection system 140 computes the score by dividing the number of missed conversions with the total number of accesses to the target stage. In some implementations, the number of missed conversions are divided by the total number of conversions that were tracked on the website. For example, if 10 conversions were missed due to performance issues and 1000 conversions were tracked for the website, an estimated 1% of conversions were lost due to the performance issue.

In some implementations, the score for the webpage may be percentages of overall conversions missed due to slow performance of the webpage. The percentages of overall missed conversions may be determined based on calculated a number of missed conversions for slow users (as illustrated in step 238) and total number of conversions for the webpage. Specifically, the number of missed conversions for slow users may be divided by the total number of conversions for the webpage to determine percentages of overall missed conversions.

At step 242, the detection system 140 determines an impact classification for the webpage based on the computed score of the webpage. In an example embodiment, high score may suggest a high impact on a conversion rate for the webpage. For all of clients whether they own a most popular or a less popular website, each webpage may be assigned with a high, medium and low impact classification. A webpage assigned to a high impact classification may show that the webpage has a high monetary impact to the website owner. In an example implementation, if the score is presented as percentages of overall missed conversions (as illustrated in step 240), the conversion impact classifications may be determined based on the percentages. For example, for a webpage, if over 1% of total conversions are lost, the webpage is assigned a high impact classification. Similarly, a webpage with conversions lost between 0.5% and 1% is assigned medium impact classification. A webpage with conversions lost between 0.1% and 0.5% is assigned low impact classification. In some scenarios, conversions lost below 0.1% may be considered as a statistical anomaly and marked as no impact to webpage's performance.

In an illustrative embodiment, the steps 232 to 248 are performed on other webpages of the website. Accordingly, scores and impact classifications may be determined for every webpage of the website.

At 250, the detection system 140 may present the impact classifications for the set of webpages to the client of the detection system 140. In some implementations, the list of impact classifications for all webpages of the website may be presented to the client on a user interface. The clients or the website owners may use this information to identify issues with different webpages and prioritize the issues to be fixed.

In prior systems, web developers or website owners typically focused on fixing a slowest webpage. However, fixing the slowest webpage first may not be the most efficient if the webpage does not have too much impact on the website owner's actual monetary goal. The present detection system 140 not just provides information about webpages being slow but also tells the owner how a specific webpage being slow impacts the overall website performance and its monetary goal. The impact information and analysis data may be presented to clients in different display formats. Some of the display formats or user interfaces used to present the analysis data to the client are described in FIG. 3-11 descriptions.

IV. Exemplary User Interfaces for Detection System

The following section describes user interfaces that may be produced according to certain embodiments described herein.

A. Impact Analysis for a Set of Webpages

Impact analysis by the detection system 130 may be performed for an individual webpage or for an entire website. The impact analysis for a website may show a list of webpages within the website and their impacts on the website's performance. FIGS. 3-7 depict exemplary user interfaces showing impact analysis for a combination of webpages of a website.

Figure 3:
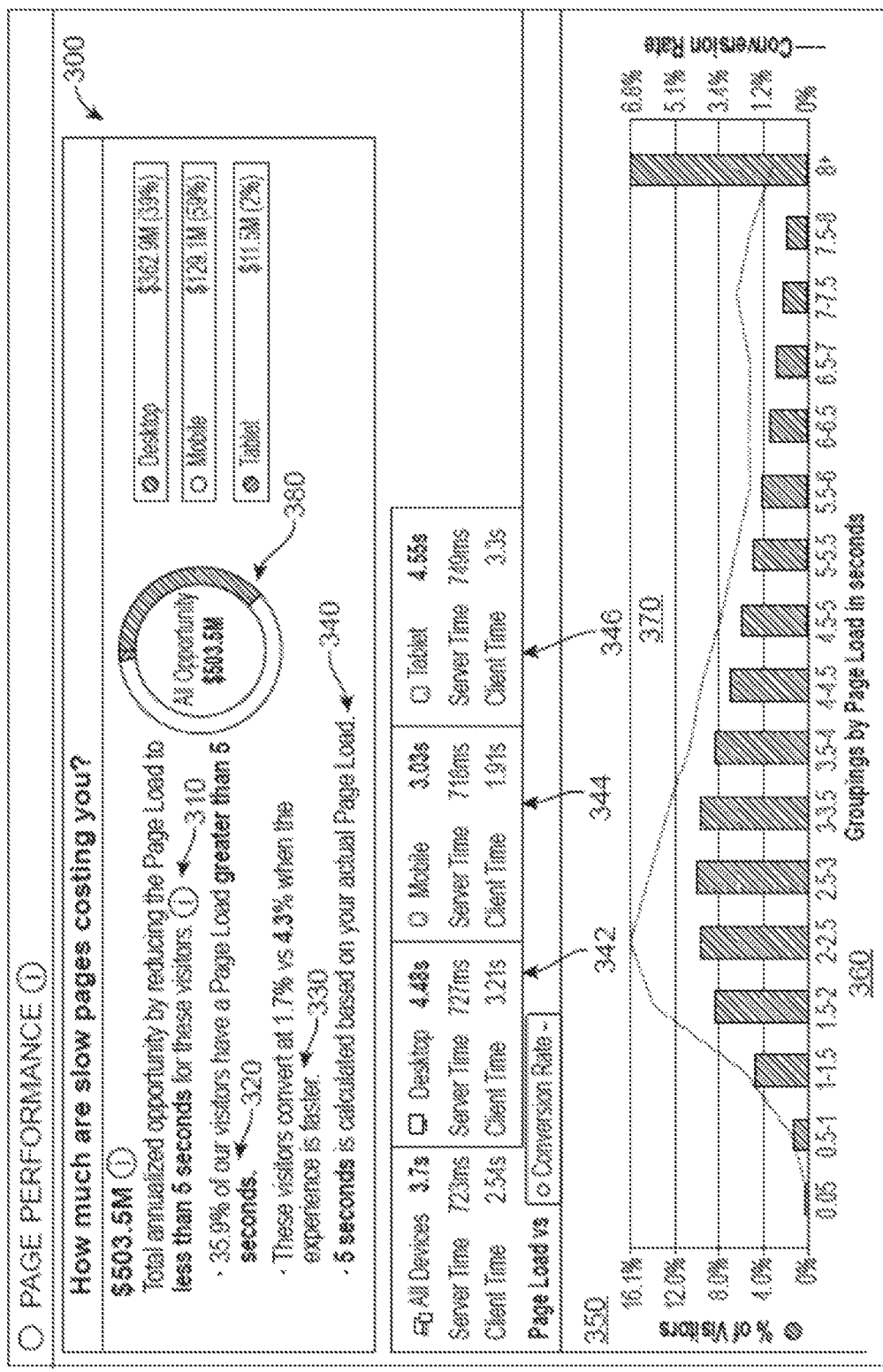
FIG. 3 illustrates an example of a user interface depicting a website performance analysis for a timing metric according to certain embodiments described herein.

FIG. 3 illustrates an example of user interface 300 depicting a website performance analysis for a timing metric according to certain embodiments described herein. User interface 300 may include analysis of a website's users' experiences (e.g., fast and slow experiences), conversion rates, and a monetary impact of a slow or fast user experience on the website.

In an illustrative embodiment, a user may select a timing metric for a website to perform a timing analysis using a user interface 500 (further illustrated in FIG. 5). The user can specify which values for the timing metric correspond to different types of web sessions (e.g., different types of users). The values of different types can be specified as different ranges, e.g., using a target value. Web sessions with timing values above can correspond to slow sessions, and web session with timing values below can be correspond to fast sessions. The user interface 300 depicts a target value 340 (e.g., a mean or median calculated based on timing values according to step 232) for timing metric for a set of webpages. In some scenarios, the target value may be provided by a client. In other scenarios, the target value (calculated by the detection system) may be changed by the client using the detection system. Accordingly, when the client has provided the target value or changed the calculated target value, the additional calculations (as illustrated in 234 to 240) may be performed based on the target value provided by the client.

In an illustrative embodiment, the user interface 300 may include an expected opportunity 380 for the website owners if certain timing values are improved and overall timing values for loading webpages on the website are below a target value 310. The opportunity 380 may show a total monetary opportunity (e.g., dollar value) in a dollar value for improving a website's performance. The opportunity 380 may show a total monetary opportunity in the user's chosen currency for improving a website's performance. The detection system may also breakdown overall opportunity by a platform (e.g., desktop, mobile, tablet, etc.), as shown in 380 of FIG. 3. In some scenarios, if the target value is changed by a client (e.g., from 5 seconds in 310 to 3 seconds), all of the calculations (as illustrated in 234 to 240) may be performed based on the target value provided by the client.

Accordingly, 310, 320, 340 may all change to new target value (e.g., 3 seconds), and monetary opportunity (380) is also recalculated based on the change in target value.

The user interface 300 may further include a graph to represent conversion rate distribution for different page load time values for visitors of the website. The graph's x-axis 360 may correspond to a page load time distribution, and the graph's y-axis may correspond to percentages of visitors 350 on the website experiencing different page load times while browsing on the website. The page load time distribution 360 (e.g., time scale 0-8 seconds) shown on x-axis corresponds to different load times experienced by users while browsing the website. The load time distribution may be further used to determine fast and slow ranges of time values based on the separation value 340 and group of users within those ranges.

The green line over the graph corresponds to the conversion rate 370 of visitors experiencing different page load times. The graph may have a different color for each different suspect attribute (as shown in FIG. 3). The user interface 300 may include similar graphs showing a page load time distribution (x-axis) and percentages of visitors (y-axis) where the visitors are using types of devices (e.g., desktop, mobile phone, tablet, etc.) while browsing the website. The windows showing these graphs may be accessed on 342, 344, and 346 tabs within user interface 300.

Figure 4:
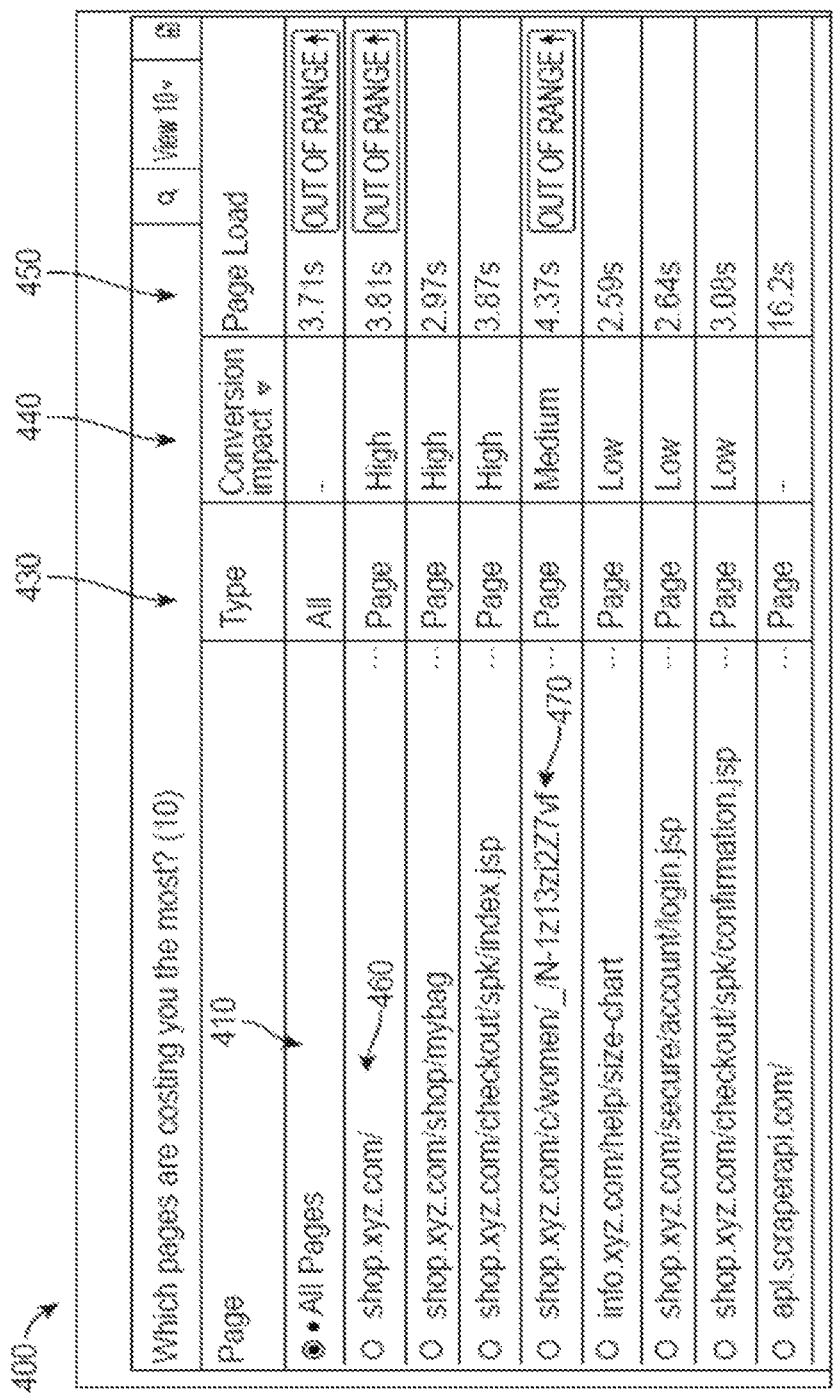
FIG. 4 illustrates an example of a user interface depicting impact classifications for each of the set of webpages according to certain embodiments described herein.

FIG. 4 illustrates an example of user interface 400 depicting impact classifications for each of the set of webpages according to certain embodiments described herein. As discussed in FIG. 2, an impact classification may be determined on a page level (a webpage) for the website to efficiently and accurately pinpoint issues within the website. The user interface 400 depicts a list of webpages for a specific website, average load times associated with the webpages, and their impact classifications. Specifically, the user interface 400 includes a table showing a list of webpages 410 for a website. For example, an entry of "shop.XYZ.com/shop/mybag" may correspond to a shopping bag related webpage for a shopping website. The interface further shows a type of the webpage under column "Type" 430, which are "page" or "All" in this example, with "All" corresponding to measurements for all of the pages.

The user interface 400 further displays a "Conversion Impact" column 440 for each of the webpages in the table. Specifically, the column depicts an impact classification (e.g., low, medium, or high impact) for each of the webpages in the table. The low, medium, or high impact (e.g., impact classification) for a webpage is determined using computations performed in steps 232-242, as described in FIG. 2 description. The user interface 400 further depicts "Page Load" (e.g., timing metric) column 450 showing average load times for each of the webpages in the table. Column 450 may show a mean of timing measurements for a specific timing metric selected by a client to perform analysis (as illustrated in steps 232-240 of FIG. 2). Accordingly, for a specific webpage, the column 450 may show an average or mean of timing values for a page load metric, a DOM completion metric, a DOM interaction metric, a first paint metric, a first contentful paint metric, a SPA transition duration, a client time, and a server time. In some scenarios, the client may sort the column 450 to view slowest to fastest timing values by clicking on the column header.

In previous methods, web developers normally focused on fixing webpages with slowest average load times. However, the table, as shown in FIG. 4, provides the developers with not just webpages with high load times but also how the high load time impacts a performance for the website. Accordingly, developers can prioritize and focus on resolving issues with webpages with high load times and high impact to the website before the webpages with high load times and low impact indications, as shown in FIG. 4.

For example, with other methods, for a webpage (460) with 2.97 seconds of load time and a webpage (470) with 4.37 seconds of load time, the developers would have focused on the webpage with 4.37 seconds of load time (slow load time). However, the webpage 460 with 2.97 seconds of load time has a much bigger impact on a conversion rate because the webpage 460 is associated with a shopping cart. So, if the cart does not respond quickly enough, the website user is more likely to leave the website before placing an order. In contrast, the webpage (470) merely displaying the category of women's clothes has lower impact on a user placing the order (e.g., conversion rate) if that specific webpage is responding slowly. The user interface 400 may be paired with user interface 300 such that user interface 400 is displayed along with user interface 300. Accordingly, both user interfaces 300 and 400 may be shown on a single dashboard or a webpage.

FIG. 5 illustrates an example of user interface 500 depicting types of timing metrics to be used for analyzing performance of a set of webpages according to certain embodiments described herein. The user interface 500 enables a client to select a timing metric from a drop down menu to perform impact analysis on a set of webpages. Different clients may prefer performing analysis using different metrics for their webpages. User interface 500 can be provided to a user before user interface 300.

Different type of timing metrics may be a page load metric (510), DOM completion metric (520), DOM interaction metric (530), first paint metric (540), first contentful paint metric (550), SPA transition duration (560), a client time (570), and a server time (580). A page load metric (510) may correspond to a time taken to load a webpage. A first paint metric (540) may correspond to a time when a part of the webpage was presented to a webpage visitor. A client time (570) may correspond to time taken by operations on a client side to load a webpage. A server time (580) may correspond to a time taken by a server to respond to a request by the client device. The interface 500 may further include a customized timing metric defined by a client. User interface 500 may be paired with user interface 400 such that user interface 500 is displayed along with user interface 400.

FIG. 6 illustrates an example of a window 600 depicting detailed descriptions of impact classifications for a set of webpages according to certain embodiments described herein. Specifically, the window 600 may pop-up when a user hovers a mouse over an impact classification of a webpage (shown in Conversion Impact column 440 of FIG. 4). For a specific webpage, the window 600 may show a drop in conversion rate (label 610) when the webpage is slow. For example, label 610 depicts a percentage value (3.4%), where the value represents a deviation in users' actions or conversion rates when the users are having a slow experience on the webpage.

The label 600 may also show percentages of visitors with slow experience (620) on that webpage. For example, 7.9% 620 shows percentages of users who visited shop.XYZ.com webpage with a page load time above a target value (e.g., 5 seconds as shown in FIG. 3). This information notifies the website developers that only 7.9% of users who visited the webpage had load time above the target value and rest of the users had a slower experience on the webpage. User interface 600 may be paired with user interface 400 such that user interface 600 is displayed along with user interface 400.

FIG. 7 illustrates an example of a window 700 depicting a historical range of timing values for a timing metric for each of a set of webpages according to certain embodiments described herein. Specifically, user interface 700 may be a label associated with a webpage entry within a table as shown in FIG. 4. The label 700 may be tagged with one or more entries of webpages with average timing value outside of a historical range for that webpage.

As shown in FIG. 7, the webpage 420 (shop.xyz.com) entry includes an "out of range" label 710. When a user hovers over a mouse on the label, the text box with range information may pop-up, as shown in FIG. 7. The interface displays an average load time (e.g., timing value) for the webpage 420 and its historical range of timing values for the webpage. User interface 700 may be paired with user interface 400 such that user interface 700 is displayed along with user interface 400. The out of range indicator suggests that the webpage was used have a different timing range but now it is a problem.

In an example embodiment, on a certain date, for a webpage shop.xyz.com 420, the recorded page load time is 3.81 seconds (as shown in 720). Historically, on the same day of week for the past few weeks, the recorded page load time was 2.5 to 3.2 seconds (730). Accordingly, the out of range label 710 informs the client that the recorded page load time for a certain date is higher than normal. Accordingly, the website owner may further analyze the data associated with the webpage to identify issues which may have contributed to making the webpage response slower than normal.

In some implementations, once the client suspects a webpage with out of range loading times (e.g., 710), the client may click on the webpage link to view specific timing analysis for the webpage. User interfaces showing timing analysis for an individual webpage are further described in FIGS. 8-11 descriptions.

B. Impact Analysis of a Single Webpage

Impact analysis by the detection system 130 may be performed for an individual webpage. FIGS. 8-11 depicts exemplary user interfaces showing impact analysis for an individual webpage for a website.

Figure 8:
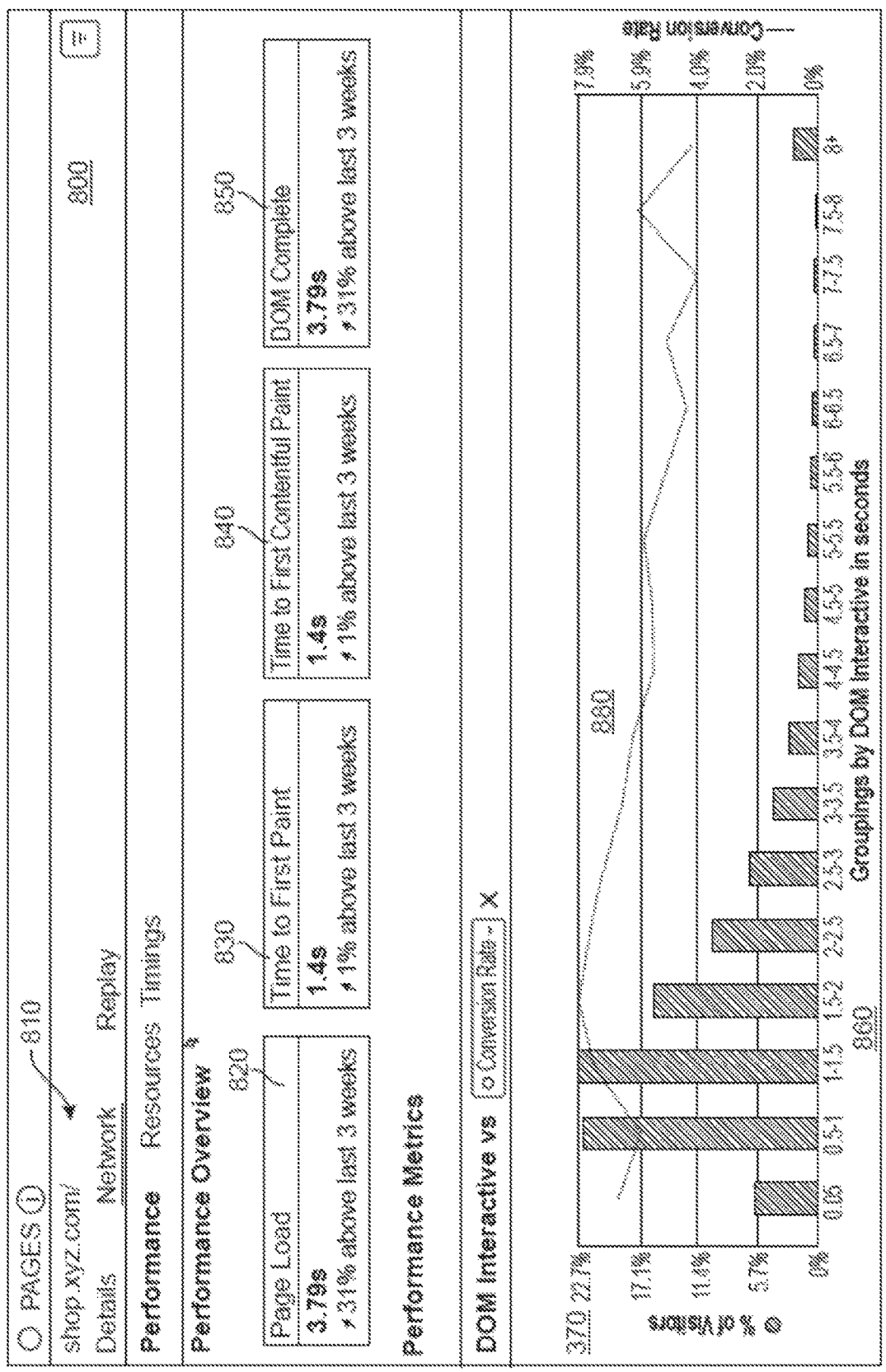
FIG. 8 illustrates an example of a user interface depicting an individual webpage performance analysis for a timing metric according to certain embodiments described herein.

FIG. 8 illustrates an example of user interface 800 depicting an individual webpage performance analysis for a timing metric according to certain embodiments described herein. The user interface 800 shows a detailed analysis for a specific webpage. The client may be provided with an option to select the webpage from the list of webpages for the website (as shown in FIG. 7). Once the client identifies a webpage from a set of webpages to fix based on impact classifications of the set of webpages, the client may click on the identified webpage to further analyze issues with the page contributing to its slow performance. The user interface 800, as shown in FIG. 8, provides detailed analysis for a single webpage which is shop.xyz.com 810.

The user interface 800 may further provide other information specific to the webpage such as an average page load time for the webpage (820), an time taken to make time to make the first visible change (830), a time taken the time taken to show meaningful content to the user (text, images, canvas, etc.) (840), and an average time taken to complete processing of Document Object Model (DOM) (850).

The user interface 800 additionally presents a graph to represent conversion rate distribution for different page load time values for visitors of the webpage. The graph's x-axis (860) may correspond to a page load time distribution (0-8 seconds) and the graph's y-axis may correspond to percentages of visitors (870) on the webpage experiencing different page load times while browsing on the webpage. The green line over the graph corresponds to the conversion rate (880) of visitors experiencing different page load times.

FIG. 9 illustrates an example of user interface 900 depicting timing calculations for a set of timing metrics to analyze performance of an individual webpage according to certain embodiments described herein. As discussed in FIG. 5 description, different type of timing metrics may be a page load metric (510), DOM completion metric (520), DOM interaction metric (530), first paint metric (540), first contentful paint metric (550), SPA transition duration (560), a client time (570), and a server time (580).

The user interface 900 may show different types of timing metrics and calculations in a table format. For each timing metric, a certain calculation is performed on a set of timing values for the webpage. Type of calculations may include an arithmetic mean of the timing values for the webpage (910), a median value of the timing values (920), a $90^{th}$ percentile value of the timing values (930), and a $95^{th}$ percentile value of the timing values (940). Similarly, these calculations are displayed for different types of the timing metrics for the webpage.

In above embodiment, these calculations (shown in 910, 920, 930 and 940) are different statistical aggregations specific to the webpage that has now been selected for analysis. The arithmetic mean (shown in 910) may be a sum of all timing values divided by the number of timing values. The median value (shown in 920) for a webpage may show 50th percentile of timing values where half of the timing values are above and the other half are below the target value. The $90^{th}$ percentile (930) value for a webpage is a time value below which 90% of time values fall. Similarly, $95^{th}$ percentile (940) value for a webpage is a time value below which 95% of time values fall. In above embodiment, mean value (shown in 920) may be dragged up or down by a relatively small number of outliers. The percentile measurements (930 and 940) help determine a breakdown of the experience across an entire audience visiting the webpage. The percentile measurements provide more accurate depiction of the webpage's performance.

Figure 10:
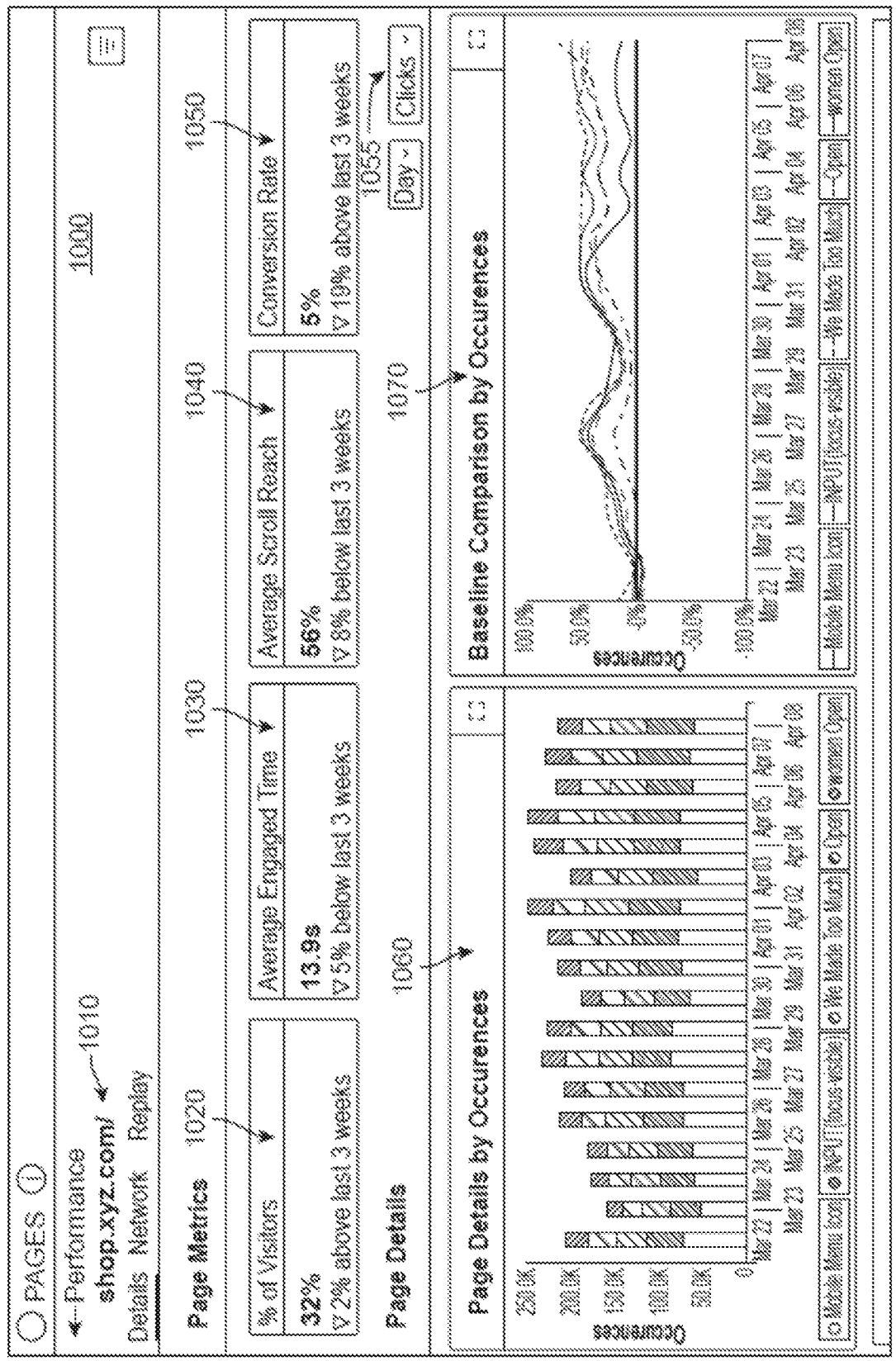
FIG. 10 illustrates an example of user interface depicting a detailed timing analysis for an individual webpage according to certain embodiments described herein.

FIG. 10 illustrates an example of user interface 1000 depicting a detailed timing analysis for an individual webpage according to certain embodiments described herein. As shown in FIG. 10, the user interface 1000 provides detailed analysis for a single webpage which is shop.xyz.com 1010. The user interface 1000 may further provide other information specific to the webpage such as a percentage of visitors who visited the webpage from total website visitors (1020), average time of engagement on the webpage (1030), an average percentage of the height of the webpage that is scrolled through by users (1040), and an average number of users who visit the webpage and subsequently convert (access target stage) later in the session (1050).

The user interface 1000 may further display the above information about the webpage in the form of a graph showing daily occurrences of the webpage. Within user interface 1000, multiple graphs (1060 and 1070) depicting occurrence of specific attributes on the webpage are shown. A client may select type of attribute from the drop down menu 1055. In some scenarios, a client may select "Clicks" within the drop down menu 1055. When a client selects "Clicks" then graphs within the user interface 1000 may show most clicked elements on a specific webpage or overall website. Graph 1060 depicts the detail of the webpage by its occurrences within a timeframe. Graph 1060 may show a stacked representation of clicks relative to each other overtime. Bigger stack on the bar may indicate that corresponding value makes up a larger portion of clicks on the webpage. Graph 1070 shows each clicked element on the webpage relative to its historical performance. In graph 1070, occurrences (y-axis) show percentages of elements being clicked on the webpage on a specific date. In the above example, occurrences above 0% (as shown in graph 1070) may indicate that elements being clicked on a specific date are higher than historical occurrence.

In some scenarios, the drop down menu may provide other options such as events or errors to be presented in graph visualizations such as graphs 1060 and 1070. The graph of timing metrics allows a client or website owner to view the timing values over a timeframe to identify an event which may have triggered the issue slowing down the webpage. One of the first things I can see here is we tell them historically how this current page load time compares to what it has been on this page.

Figure 11:
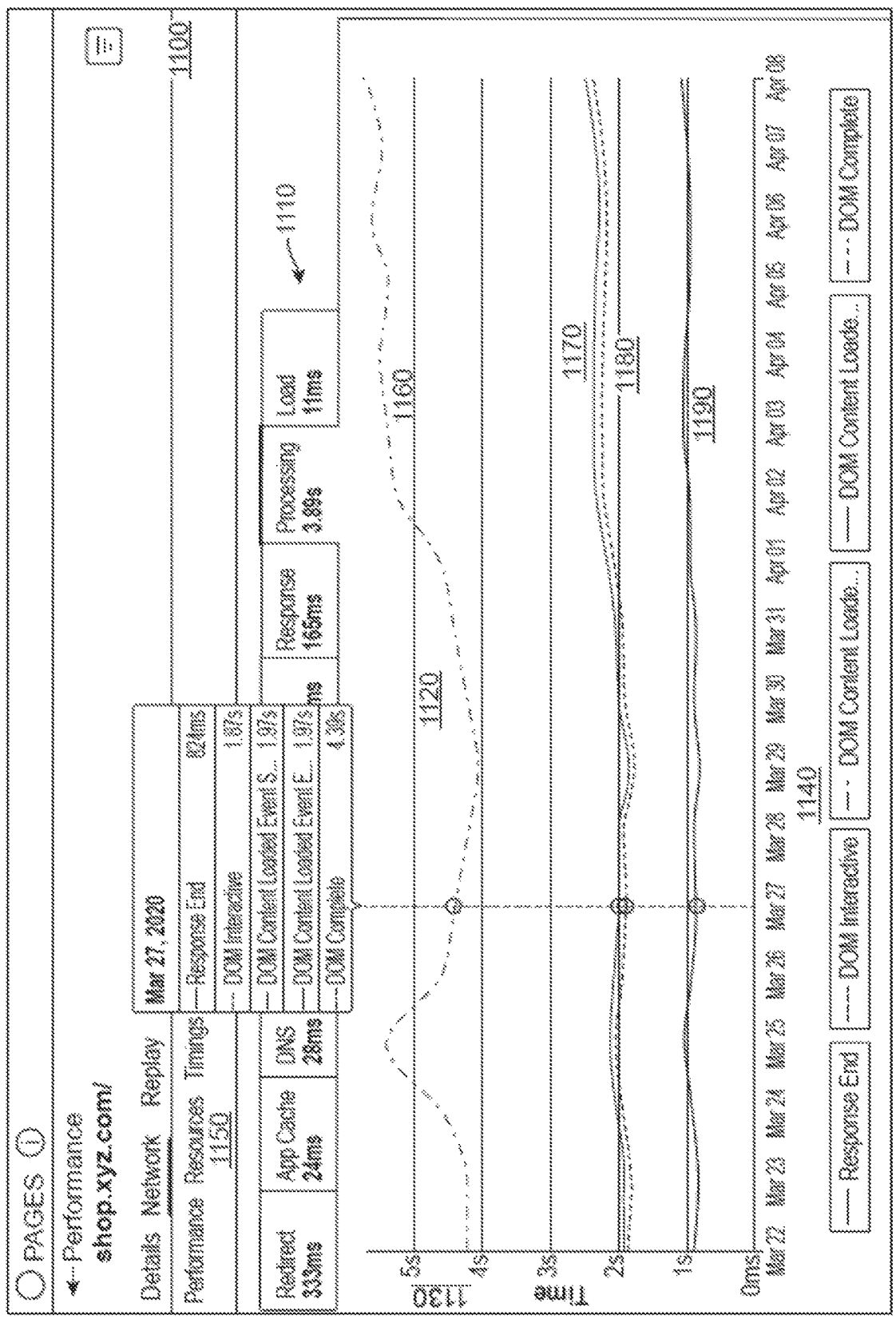
FIG. 11 illustrates an example of user interface depicting load times for phases of page load life cycle for an individual webpage according to certain embodiments described herein.

FIG. 11 illustrates an example of user interface 1100 depicting load times for phases of page load life cycle for an individual webpage according to certain embodiments described herein. The user interface 1100 may help a website provider or a client identify one or more phases of a page load life cycle or a webpage loading process contributing to slow performance of the webpage. The time series breakdown for different dates (as shown in FIG. 11) may help identify timeframe of start of degradation in performance. For instance, under user interface 900, if a client determines that a specific timing metric (e.g., server time) is contributing to a large proportion of total load time, then the client may access to user interface 1100 and identify a point in time at which the response from the server started taking much longer than it did before.

The user interface 1100 provides detailed analysis for a single webpage, which is shop.xyz.com 1010. User interface 1100 may depict load times (e.g., timing values) for different phases of page load life cycle in a graph form for a specific timeframe. The different phases of page load life cycle (1110) may be redirect time, Application cache time, DNS time, request time, response time, processing time, loading time, and TCP time, as shown in FIG. 11. In an example implementation, different phases of page load life cycles may be phases of standard performance phases for a web browser. The phases of page load life cycle may be made up of individual or multiple timing metrics. In FIG. 11, behind the pop-up window, timing values for the phases of page load cycle are shown. A length of a phase may be determined by subtracting the timing metric at the beginning of the phase from the timing metric at the end of the phase.

As shown in FIG. 11, the user interface 1100 shows a graph of load times for page load life cycle phases within a certain time period. The x-axis of the graph may correspond to a list of dates within a selected timeframe by a client. In the graph, y-axis (1130) may be load time values shown in seconds. Once a user determines a timeframe where the problem may be triggered on the webpage (based on information presented in User Interface 1000), the user can then expand the timeframe under FIG. 11 to analyze components and network operations involved in triggering the webpage issue. A client may select a specific timeframe for the graph and the graph may be adjusted according to the selected timeframe. Load times for multiple timing metrics may be shown in the same graph (e.g., 1160, 1170, 1180, and 1190).

A timing value for a specific timing metric for the webpage may correspond to a phase of the page load life cycle. The information, as presented in FIG. 11 may help the client of the website to determine what part of the webpages loading life cycle are contributing to slow performance of the webpage. User interface 1100 may help a specific team of engineering to focus on network operations and components of the webpage to identify potential issues with the webpage showing the performance of the webpage.

For the graph 1120, the user may change a timeframe of the graph to figure out exactly when timing values started to change and what particular part of the page might be contributing to that problem. If the timing scale shows that page load time jumped at a particular time, the user can analyze network operations and components of the webpage that may have contributed to that problem.

The client may be able to save specific analysis presented in the user interface 1100 in form of a URL and send the URL to a web developer for additional analysis. Accordingly, a specific engineering team can focus on a specific issue instead of going through all the timing data to analyze the issue. Accordingly, the client can identify a timeframe and components within the webpage contributing to the issue and pass on this detail to the web developer. In some implementations, certain engineering teams may be assigned to certain webpages of the website. Accordingly, a client may directly forward specific webpage issues to those teams.

User interfaces presented in FIG. 3-11 may be saved in a webpage with a URL linked to the webpage. Each webpage may provide links to one or more other user interfaces. The link may be forwarded to different teams responsible for the website. The user interface 1100 may further include a link to a resources interface 1150. Resources may correspond to individual building blocks of the webpage. For example, resources may be images, style sheets, JavaScript files, or fonts. The resource interface 1150 may provide information on each of the resources and identify fast and slow resources. For example, loading a particular image within a webpage may be slowing down the loading of the webpage because it is too large. Accordingly, the resource interface may help web developers to identify individual building blocks of the webpage that might be contributing to the slowness of the webpage.

V. Exemplary Computer System

Figure 12:
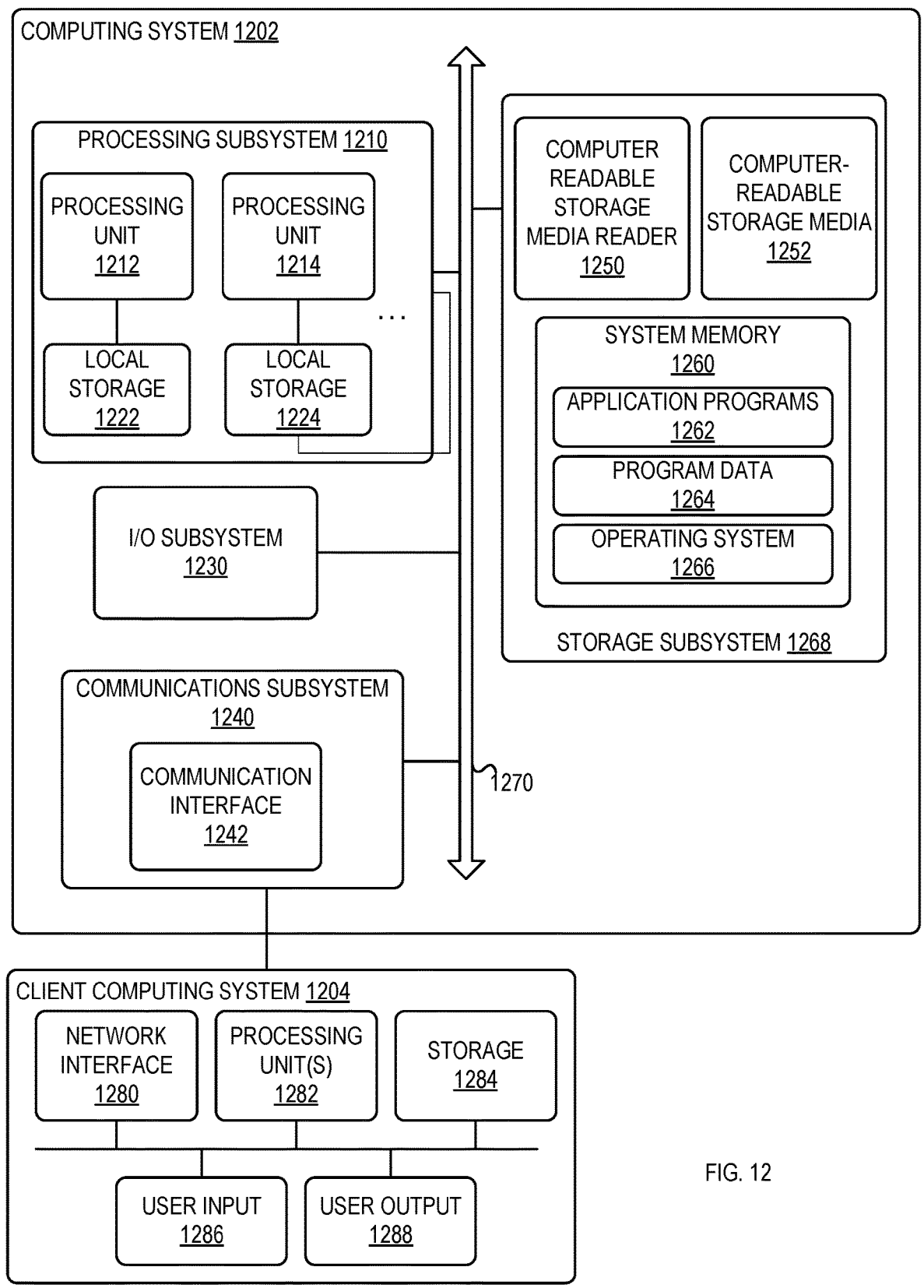
FIG. 12 illustrates an example of a computing system that may be used with certain embodiments described herein.

Various operations described herein may be implemented on computer systems, which may be of generally conventional design. FIG. 12 shows a simplified block diagram of a representative computing system 1202 and client computing system 1204 usable to implement certain embodiments of the present disclosure. In various embodiments, computing system 802 or similar systems may implement capture management system, or any other computing system described herein or portions thereof.

Computing system 1202 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 1202 may include processing subsystem 1210. Processing subsystem 1210 may communicate with a number of peripheral systems via bus subsystem 1270. These peripheral systems may include I/O subsystem 1230, storage subsystem 1268, and communications subsystem 1240.

Bus subsystem 1270 provides a mechanism for letting the various components and subsystems of server computing system 1204 communicate with each other as intended.

Although bus subsystem 1270 is shown schematically as a single bus, alternative embodiments of the bus subsystem may utilize multiple buses. Bus subsystem 1270 may form a local area network that supports communication in processing subsystem 1210 and other components of server computing system 1220. Bus subsystem 1270 may be implemented using various technologies including server racks, hubs, routers, etc. Bus subsystem 1270 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 1230 may include devices and mechanisms for inputting information to computing system 1202 and/or for outputting information from or via computing system 802. In general, use of the term "input device" is intended to include all possible types of devices and mechanisms for inputting information to computing system 1202. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 1202 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 1210 controls the operation of computing system 802 and may comprise one or more processing units 1212, 1214, etc. A processing unit may include one or more processors, including single core processor or multicore processors, one or more cores of processors, or combinations thereof. In some embodiments, processing subsystem 1210 may include one or more special purpose co-processors such as graphics processors, digital signal processors (DSPs), or the like. In some embodiments, some or all of the processing units of processing subsystem 1210 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 1222, 1224. Any type of processors in any combination may be included in processing unit(s) 1212, 1214.

In some embodiments, processing subsystem 1210 may be implemented in a modular design that incorporates any number of modules (e.g., blades in a blade server implementation). Each module may include processing unit(s) and local storage. For example, processing subsystem 1210 may include processing unit 1212 and corresponding local storage 1222, and processing unit 1214 and corresponding local storage 1224.

Local storage 1222, 1224 may include volatile storage media (e.g., conventional DRAM, SRAM, SDRAM, or the like) and/or non-volatile storage media (e.g., magnetic or optical disk, flash memory, or the like). Storage media incorporated in local storage 1222, 1224 may be fixed, removable or upgradeable as desired. Local storage 1222, 1224 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 1212, 1214 need at runtime. The ROM may store static data and instructions that are needed by processing unit(s) 1212, 1214. The permanent storage device may be a non-volatile read-and-write memory device that may store instructions and data even when a module including one or more processing units 1212, 1214 and local storage 1222, 1224 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 1222, 1224 may store one or more software programs to be executed by processing unit(s) 1212, 1214, such as an operating system and/or programs implementing various server functions such as functions of capture management system, or any other server(s) associated with capture management system. "Software" refers generally to sequences of instructions that, when executed by processing unit(s) 1212, 1214 cause computing system 1202 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 1212, 1214. In some embodiments the instructions may be stored by storage subsystem 868 (e.g., computer readable storage media). In various embodiments, the processing units may execute a variety of programs or code instructions and may maintain multiple concurrently executing programs or processes. At any given time, some or all of the program code to be executed may be resident in local storage 1222, 1224 and/or in storage subsystem including potentially on one or more storage devices. Software may be implemented as a single program or a collection of separate programs or program modules that interact as desired. From local storage 1222, 1224 (or non-local storage described below), processing unit(s) 1212, 1214 may retrieve program instructions to execute and data to process in order to execute various operations described above.

Storage subsystem 1268 provides a repository or data store for storing information that is used by computing system 1202. Storage subsystem 1268 provides a tangible non-transitory computer-readable storage medium for storing the basic programming and data constructs that provide the functionality of some embodiments. Software (programs, code modules, instructions) that when executed by processing subsystem 1210 provide the functionality described above may be stored in storage subsystem 1268. The software may be executed by one or more processing units of processing subsystem 1210. Storage subsystem 1268 may also provide a repository for storing data used in accordance with the present disclosure.

Storage subsystem 1268 may include one or more non-transitory memory devices, including volatile and non-volatile memory devices. As shown in FIG. 12, storage subsystem 1268 includes a system memory 1260 and a computer-readable storage media 1252. System memory 1260 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 802, such as during start-up, may typically be stored in the ROM. The RAM typically contains data and/or program modules that are presently being operated and executed by processing subsystem 1210. In some implementations, system memory 1260 may include multiple different types of memory, such as static random access memory (SRAM) or dynamic random access memory (DRAM). Storage subsystem 1268 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 1268.

By way of example, and not limitation, as depicted in FIG. 12, system memory 1260 may store application programs 1262, which may include client applications, Web browsers, mid-tier applications, relational database management systems (RDBMS), etc., program data 1264, and one or more operating systems 1266. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1252 may store programming and data constructs that provide the functionality of some embodiments. Software (programs, code modules, instructions) that when executed by processing subsystem 1210 a processor provide the functionality described above may be stored in storage subsystem 1268. By way of example, computer-readable storage media 1252 may include non-volatile memory such as a hard disk drive, a magnetic disk drive, an optical disk drive such as a CD ROM, DVD, a Blu-Ray® disk, or other optical media. Computer-readable storage media 1252 may include, but is not limited to, Zip® drives, flash memory cards, universal serial bus (USB) flash drives, secure digital (SD) cards, DVD disks, digital video tape, and the like. Computer-readable storage media 1252 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1252 may provide storage of computer-readable instructions, data structures, program modules, and other data for computing system 1202.

In certain embodiments, storage subsystem 1268 may also include a computer-readable storage media reader 1250 that may further be connected to computer-readable storage media 1252. Together and, optionally, in combination with system memory 1260, computer-readable storage media 1252 may comprehensively represent remote, local, fixed, and/or removable storage devices plus storage media for storing computer-readable information.

In certain embodiments, computing system 1202 may provide support for executing one or more virtual machines. Computing system 1202 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 1202. Accordingly, multiple operating systems may potentially be run concurrently by computing system 1202. Each virtual machine generally runs independently of the other virtual machines.

Communication subsystem 1240 provides an interface to other computer systems and networks. Communication subsystem 1240 serves as an interface for receiving data from and transmitting data to other systems from computing system 1202. For example, communication subsystem 1240 may enable computing system 1202 to establish a communication channel to one or more client computing devices via the Internet for receiving and sending information from and to the client computing devices.

Communication subsystem 1240 may support both wired and/or wireless communication protocols. For example, in certain embodiments, communication subsystem 1240 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 1240 may provide wired network connectivity (e.g., Ethernet) in addition to or instead of a wireless interface.

Communication subsystem 1240 may receive and transmit data in various forms. For example, in some embodiments, communication subsystem 1240 may receive input communication in the form of structured and/or unstructured data feeds, event streams, event updates, and the like. For example, communication subsystem 1240 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 1240 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 1240 may also be configured to output the structured and/or unstructured data feeds, event streams, event updates, and the like to one or more databases that may be in communication with one or more streaming data source computers coupled to computing system 1202.

Communication subsystem 1240 may provide a communication interface 1242, e.g., a WAN interface, which may provide data communication capability between the local area network (bus subsystem 1270) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 1202 may operate in response to requests received via communication interface 1242. Further, in some embodiments, communication interface 1242 may connect computing systems 1202 to each other, providing scalable systems capable of managing high volumes of activity. Conventional or other techniques for managing server systems and server farms (collections of server systems that cooperate) may be used, including dynamic resource allocation and reallocation.

Computing system 1202 may interact with various user-owned or user-operated devices via a wide-area network such as the Internet. An example of a user-operated device is shown in FIG. 12 as client computing system 1202. Client computing system 1204 may be implemented, for example, as a consumer device such as a smart phone, other mobile phone, tablet computer, wearable computing device (e.g., smart watch, eyeglasses), desktop computer, laptop computer, and so on.

For example, client computing system 1204 may communicate with computing system 802 via communication interface 1242. Client computing system 1204 may include conventional computer components such as processing unit(s) 1282, storage device 1284, network interface 1280, user input device 1286, and user output device 1288. Client computing system 1204 may be a computing device implemented in a variety of form factors, such as a desktop computer, laptop computer, tablet computer, smart phone, other mobile computing device, wearable computing device, or the like.

Processing unit(s) 1282 and storage device 1284 may be similar to processing unit(s) 1212, 1214 and local storage 1222, 1224 described above. Suitable devices may be selected based on the demands to be placed on client computing system 1204; for example, client computing system 1204 may be implemented as a "thin" client with limited processing capability or as a high-powered computing device. Client computing system 1204 may be provisioned with program code executable by processing unit(s) 882 to enable various interactions with computing system 1202 of a message management service such as accessing messages, performing actions on messages, and other interactions described above. Some client computing systems 1204 may also interact with a messaging service independently of the message management service.

Network interface 1280 may provide a connection to a wide area network (e.g., the Internet) to which communication interface 1240 of computing system 1202 is also connected. In various embodiments, network interface 1280 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 1286 may include any device (or devices) via which a user may provide signals to client computing system 1204; client computing system 1204 may interpret the signals as indicative of particular user requests or information. In various embodiments, user input device 1286 may include any or all of a keyboard, touch pad, touch screen, mouse or other pointing device, scroll wheel, click wheel, dial, button, switch, keypad, microphone, and so on.

User output device 1288 may include any device via which client computing system 804 may provide information to a user. For example, user output device 1288 may include a display to display images generated by or delivered to client computing system 1204. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 1288 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1212, 1214 and 1282 may provide various functionality for computing system 802 and client computing system 1204, including any of the functionality described herein as being performed by a server or client, or other functionality associated with message management services.

It will be appreciated that computing system 1202 and client computing system 804 are illustrative and that variations and modifications are possible. Computer systems used in connection with embodiments of the present disclosure may have other capabilities not specifically described here. Further, while computing system 1202 and client computing system 1204 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While this disclosure has been described with respect to specific embodiments, one skilled in the art will recognize that numerous modifications are possible. For instance, although specific processes are described with reference to FIGS. 1 and 2, other processes may be implemented. Embodiments of this disclosure may be realized using a variety of computer systems and communication technologies including but not limited to specific examples described herein.

In the detailed description of exemplary embodiments of this disclosure, reference is made to the accompanying drawings which form a part hereof, and in which is shown by way of illustration specific exemplary embodiments in which this disclosure may be practiced. These embodiments are described in sufficient detail to enable those skilled in the art to practice this disclosure, and it is to be understood that other embodiments may be utilized and that logical, mechanical, electrical and other changes may be made without departing from the scope of the present disclosure.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

It is apparent for those skilled in the art that, for the particular operation processes of the units described above, reference may be made to the corresponding steps/components in the related method/system embodiment sharing the same concept and the reference is regarded as the disclosure of the related units too. And therefore some of the particular operation processed will not be described repeatedly or in detail for concision of the description.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional, functional, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer apparatus may include a monitor, printer, or other suitable display for providing any of the results mentioned herein to a user.

Any of the methods disclosed herein may be totally or partially performed with a computer system including one or more processors, which can be configured to perform the steps. Thus, embodiments can be directed to computer systems configured to perform the steps of any of the methods disclosed herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of this disclosure. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, this disclosure can include any variety of combinations and/or integrations of the embodiments disclosed herein. However, other embodiments of this disclosure may be directed to specific embodiments relating to each individual aspect, or specific combinations of these individual aspects. Thus, although this disclosure has been described with respect to specific embodiments, it will be appreciated that this disclosure is intended to cover all modifications and equivalents within the scope of the following claims.

Upon reading this detailed description, those of skill in the art will appreciate still additional alternative structural and functional designs for a system and method for compact data storage of network traffic and efficient search through the disclosed principles of the present disclosure. Thus, while particular embodiments and applications of the present disclosure have been illustrated and described, it is to be understood that this disclosure is not limited to the precise construction and components disclosed herein and that various modifications, changes and variations which will be apparent to those skilled in the art may be made in the arrangement, operation and details of the method and apparatus of the present disclosure herein without departing from the spirit and scope of this disclosure as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method comprising:
    retrieving, by a detection system from a capture agent, a plurality of timing metrics for a set of webpages of a website, wherein the capture agent is a software agent embedded to the set of webpages, wherein the plurality of timing metrics are associated with a plurality of network operations involving the set of webpages, the set of webpages comprising of a plurality of stages including a target stage;
    for each webpage in the set of webpages:
        determining, by the detection system, a timing distribution for the webpage based on a plurality of timing values for a timing metric from the plurality of timing metrics, wherein the plurality of timing values are associated with a plurality of web sessions on a plurality of user devices involving the webpage, and wherein the capture agent monitors and captures the plurality of timing values for the plurality of web sessions;
        identifying, by the detection system, a first range of the timing distribution for a slow group of users;
        identifying, by the detection system, a second range of the timing distribution for a fast group of users, wherein the second range is greater than the first range;
        computing, by the detection system, a first rate of the slow group of users for the webpage reaching the target stage and a second rate of the fast group of users for the webpage accessing the target stage;
        identifying, by the detection system, a number of users that reached the target stage;
        determining, by the detection system, an impact classification for the webpage based on the first rate, the second rate, and the number of users that reached the target stage; and
    displaying, by the detection system, the impact classification for each webpage in the set of webpages for a user to identify at least one network operation contributing to poor performance of the website.

2. The computer-implemented method of claim 1, wherein determining the impact classification for the webpage comprises:
    determining, by the detection system, a number of missed accesses to the target stage based on the first rate for the slow group of users;
    computing, by the detection system, a score for the webpage based the number of missed accesses to the target stage and the number of users that reached the target stage; and
    determining, by the detection system, the impact classification for the webpage based on the computed score for the webpage.

3. The computer-implemented method of claim 2, wherein determining the number of missed accesses to the target stage comprises:
    determining, by the detection system, a number of slow sessions for the slow group of users and a number of users from the slow group of users reaching the target stage;
    multiplying, by the detection system, the number of slow sessions for the slow group of users and the second rate of the fast group of users; and
    subtracting, by the detection system, the number of users from the slow group of users reaching the target stage.

4. The computer-implemented method of claim 2, wherein computing the score for the webpage comprises:
    dividing, by the detection system, the number of missed accesses to the target stage by the number of users for the webpage that reached the target stage.

5. The computer-implemented method of claim 2, wherein the impact classification for the webpage is one of low, medium, or high based on the computed score of the webpage.

6. The computer-implemented method of claim 2, further comprising:

identifying, by the detection system, at least one network operation and at least one attribute associated with the network operation impacting performance of the website based on the plurality of timing values and the computed score for the webpage.

7. The computer-implemented method of claim 6, wherein the at least one attribute is a portion or a specific building block of the webpage impacting the performance of the website.

8. The computer-implemented method of claim 1, wherein the timing distribution is determined based on a tri-mean median of the plurality of timing values for the webpage.

9. The computer-implemented method of claim 1, wherein the first rate is computed based upon a number of the web sessions involving the webpage and a number of the web sessions involving the slow group of users that reached the target stage and wherein the second rate is computed based upon a number of the web sessions involving the webpage and a number of web sessions involving the fast group of users that reached the target stage.

10. The computer-implemented method of claim 1, wherein the plurality of timing metrics are at least one of a server response time, a client response time, a webpage load time, a Document Object Model (DOM) response time, and a Single Page Application (SPA) transition time.

11. The computer-implemented method of claim 1, wherein the target stage is a resulting webpage accessed by the slow group of users or the fast group of users to achieve a particular result or an objective, wherein the particular result is at least one of placing an order, registering for a website, signing up for a mailing list, opening a link, or performing any other action.

12. The computer-implemented method of claim 1, wherein the capture agent includes Javascript.

13. A system comprising:
one or more processors; and
a non-transitory computer-readable medium including instructions that, when executed by the one or more processors, cause the one or more processors to:
retrieve, from a capture agent, a plurality of timing metrics for a set of webpages of a web site, wherein the capture agent is a software agent embedded to the set of webpages, wherein the plurality of timing metrics are associated with a plurality of network operations involving the set of webpages, the set of webpages comprising of a plurality of stages including a target stage;
for each webpage in the set of webpages:
determine a timing distribution for the webpage based on a plurality of timing values for a timing metric from the plurality of timing metrics, wherein the plurality of timing values are associated with a plurality of web sessions on a plurality of user devices involving the webpage, and wherein the capture agent monitors and captures the plurality of timing values for the plurality of web sessions;
identify a first range of the timing distribution for a slow group of users;
identify a second range of the timing distribution for a fast group of users, wherein the second range is greater than the first range;
compute a first rate of the slow group of users for the webpage reaching the target stage and a second rate of the fast group of users for the webpage accessing the target stage;
identify a number of users that reached the target stage;
determine an impact classification for the webpage based on the first rate, the second rate, and the number of users that reached the target stage; and
display the impact classification for each webpage in the set of webpages for a user to identify at least one network operation contributing to poor performance of the website.

14. The system of claim 13, wherein to determine the impact classification for the webpage comprises the instructions, the one or more processors further cause the one or more processors to:
determine a number of missed accesses to the target stage based on the first rate of the slow group of users;
compute a score for the webpage based the number of missed accesses to the target stage and the number of users that reached the target stage; and
determine the impact classification for the webpage based on the computed score for the webpage.

15. The system of claim 14, wherein to determine the number of missed accesses to the target stage, the one or more processors further cause the one or more processors to:
determine a number of slow sessions for the slow group of users and a number of users from the slow group of users reaching the target stage;
multiply the number of slow sessions for the slow group of users and the second rate of the fast group of users; and
subtract the number of users from the slow group of users reaching the target stage.

16. The system of claim 14, wherein the impact classification for the webpage is one of low, medium, or high based on the computed score of the webpage.

17. The system of claim 13, wherein the timing distribution is determined based on a tri-mean median of the plurality of timing values for the webpage.

18. The system of claim 13, wherein the plurality of timing metrics are at least one of a server response time, a client response time, a webpage load time, a Document Object Model (DOM) response time, and a Single Page Application (SPA) transition time.

19. The system of claim 13, wherein the first rate is computed based upon a number of the web sessions involving the webpage and a number of the web sessions involving the slow group of users that reached the target stage and wherein the second rate is computed based upon a number of the web sessions involving the webpage and a number of web sessions involving the fast group of users that reached the target stage.

20. The system of claim 13, wherein the target stage is a resulting webpage accessed by the slow group of users or the fast group of users to achieve a particular result or an objective, wherein the particular result is at least one of placing an order, registering for a website, signing up for a mailing list, opening a link, or performing any other action.

* * * * *